United States Patent
Lee et al.

(10) Patent No.: US 7,336,777 B2
(45) Date of Patent: Feb. 26, 2008

(54) METHOD AND APPARATUS FOR MANAGING PRESENTING AND CHANGING RING-BACK SOUNDS IN SUBSCRIBER-BASED RING-BACK SOUND SERVICE

(75) Inventors: Sang-Yoen Lee, Kyungki-do (KR); Hee-Hyuk Ham, Seoul (KR); Ki-Moon Kim, Inchon (KR); Young-Tae Noh, Seoul (KR); Jae-Young Park, Kyungki-do (KR)

(73) Assignee: SK Telecom Co., Ltd., Seoul (KR)

( * ) Notice: Subject to any disclaimer, the term of this patent is extended or adjusted under 35 U.S.C. 154(b) by 199 days.

(21) Appl. No.: 10/524,098

(22) PCT Filed: Aug. 7, 2003

(86) PCT No.: PCT/KR03/01586

§ 371 (c)(1),
(2), (4) Date: Feb. 9, 2005

(87) PCT Pub. No.: WO2004/016015

PCT Pub. Date: Feb. 19, 2004

(65) Prior Publication Data

US 2005/0207555 A1    Sep. 22, 2005

(30) Foreign Application Priority Data

Aug. 10, 2002  (JP)  .................... 10-2002-0047337
Aug. 14, 2002  (JP)  .................... 10-2002-0048224
Sep. 6, 2002   (JP)  .................... 10-2002-0053829

(51) Int. Cl.
*H04M 3/42* (2006.01)

(52) U.S. Cl. ............... 379/207.08; 379/207.16; 379/211.03; 379/211.04; 379/374.03; 379/375.01; 455/433; 455/466

(58) Field of Classification Search ........... 379/207.08, 379/207.16, 374.01, 211.03, 211.04, 374.03, 379/375.01; 455/433, 466
See application file for complete search history.

(56) References Cited

U.S. PATENT DOCUMENTS

| 5,926,537 | A | 7/1999 | Birze |
| 6,574,335 | B1* | 6/2003 | Kalmanek et al. .......... 379/386 |
| 7,006,622 | B2* | 2/2006 | Laine .................... 379/374.01 |

FOREIGN PATENT DOCUMENTS

| KR | 2001-95885 | 11/2001 |
| KR | 2002-30381 | 4/2002 |

* cited by examiner

*Primary Examiner*—Quynh H. Nguyen
(74) *Attorney, Agent, or Firm*—Harness, Dickey & Pierce, PLC

(57) ABSTRACT

Disclosed herein is a method and apparatus for managing ring-back sounds in a subscriber-based ring-back sound service. The method includes the first step of storing common ring-back sounds and reporting details of use of the common ring-back sounds, the second step of storing individual ring-back sounds and reporting details of use of the individual ring-back sounds, and the third step of statistically compiling the reported details of use and determining whether to maintain storage of the ring-back sounds based up the statistically complied details. A method and apparatus for presenting and changing ring-back sounds based upon the ring-back sound managing method and apparatus are provided.

22 Claims, 17 Drawing Sheets

| PARAMETER =CallingFeaturesindicator2 | | | | | | | | LENGTH=V | TAG =H'9fff7d | |
|---|---|---|---|---|---|---|---|---|---|---|
| CONTENTS | | | | | | | | | MEANING | |
| H | G | F | E | D | C | B | A | Octet | Notes | |
| VMSB | | VMSU | | MC | | CC | | 1 | | |
| FMSNA | | FMSB | | FMSU | | VMSNA | | 2 | a | |
| SRBT | | NCW | | Prefer_Sys | | MUDN | | 3 | | |
| .... | | | | | | | | n | | |

METHOD AND APPARATUS FOR MANAGING PRESENTING AND CHANGING RING-BACK SOUNDS IN SUBSCRIBER-BASED RING-BACK SOUND SERVICE

TECHNICAL FIELD

The present invention relates generally to a method and apparatus for managing ring-back sounds in a subscriber-based ring-back sound service and, more particularly, to a method and apparatus for managing ring-back sounds in a subscriber-based ring-back sound service, which improves an existing ring-back tone service by providing originators with ring-back sounds that terminating subscribers want, instead of a uniform ring-back tone. In addition, the present invention relates to a method and apparatus for presenting and changing ring-back sounds in a ring-back sound service based upon the ring-back sound managing method and apparatus.

BACKGROUND ART

In general, in the case where an originator tries a phone call on a conventional mobile communications network, there is used a method in which a terminating mobile switching center provides a uniform ring-back tone to the originator. However, such a conventional ring-back tone service method is problematic in that the conventional ring-back tone service method provides a uniform tone, so that an originator cannot determine whether an erroneous connection is made or not before the response of a terminator and various ring-back sound services consistent with the characteristics of users cannot be provided. Recently, there was proposed a method of providing various advertising sounds instead of the uniform ring-back tone described above. However, this method is also problematic in that a network provider provides advertising sounds to originators without choice and allows the originators to make calls free of charge for a certain time, an originator cannot determine whether an erroneous connection is made or not before the response of a terminator and various ring-back sound services consistent with the characteristics of users cannot be provided.

In order to solve the above-described problems, the applicant of the present invention proposed a subscriber-based ring-back sound service method that provides originators with specific ring-back sounds registered or selected by subscribers, which is described with reference to FIG. 1 below.

FIG. 1 is a flowchart showing the prior art subscriber-based ring-back sound service method proposed by the applicant of the present invention (see Korean Pat Appl. No. 10-2002-0010006 filed on Feb. 25, 2002).

When an originator calls a subscriber to a service proposed by the patent application and requests a call connection, a corresponding originating Mobile Switching Center (MSC) 31 requests terminating location information from a Home Location Register (HLR) 10 at step S101.

The HRL 10 requests routing information from a terminating MSC 32 in response to the request of step S101 at step S102, and the terminating MSC 32 provides the routing information (Temporary Local Directory Number (TLDN)) to the HLR 10 in response to the request of step S102 at step S103.

The HLR 10 transmits the routing information to the originating MSC 31 in response to the request of step S101 at step S104. Accordingly, the originating MSC 31 requests a trunk (hereinafter referred to as "ISDN User Part (ISUP)") call connection from the terminating MSC 32 based upon the routing information to establish a call path at step S105.

Thereafter, if it is determined that a terminator is a subscriber to the service of the patent application and the service is activated based upon service establishment information and information for performing routing to an Intellectual Peripheral (IP) 50 provided by the HLR 10 and previously stored in the terminating MSC 32 at the time of registering the location, the terminating MSC 32 requests an ISUP call connection from the IP 50 to establish a trunk call path based upon this routing information and, at this time, provides both a terminating phone number and an originating phone number at step S106. As a result, the call paths are established among the originating MSC 31, the terminating MSC 32 and the IP 50. For reference, the service establishment information and the routing information are included in a location registration response message downloaded from the HRL 10 to the terminating MSC 32, and are provided to the terminating MSC 32.

The IP 50 inquires a ring-back sound code from the IP server 70 based upon the provided terminating and originating phone numbers at step S107, and the IP server 70 searches for the ring-back sound code allocated in connection with the provided terminating and originating phone numbers and transmits the searched ring-back sound code to the IP 50 in response to the inquiry of step S107 at step S108. The IP 50 transmits a ring-back sound corresponding to the received ring-back back sound code, instead of a ring-back tone, to the originator through the established call path at step S109.

Finally, when the terminating subscriber answers the phone while the ring-back sound is being transmitted to the originator, the terminating MSC 32 requests the IP 50 to disconnect the ISUP call connection so that the IP 50 can disconnect the ISUP call connection at step S110, and, at the same tune, allows the originator and the terminating subscriber to make a call through the call path established between the originating MSC 31 and the terminating MSC 32 at step S111.

Meanwhile, in the above-described conventional subscriber-based ring-back sound service method, as the number of subscribers increases, the IP 50 should store a larger number of ring-back sounds. The ring-back sounds may be classified into two types: common ring-back sounds fixedly stored in the IP 50 and individual ring-back sounds recorded, edited and uploaded on the Internet by subscribers. As the ring-back sound service is continuously provided, the number of common ring-back sounds provided by a Content Provider (CP) increases, and the number of individual ring-back sounds increases due to an increased number of subscribers, so that the number of ring-back sounds to be stored must explosively increase. Accordingly, there is an inconvenience, in which the capacity of geometrically distributed IPs should be expanded when the number of ring-back sounds to be stored exceeds the capacity of the IPs, or a problem, in which individual ring-back sounds are not sufficiently serviced because the expansion of capacity of the IPs does not catch up with the increased number of ring-back sounds.

Further, as described above, in the case where an originator tries a phone call in a conventional mobile communications network, there is used a method in which a terminating MSC provides a uniform ring-back tone to the originator. However, such a conventional ring-back tone service method is problematic in that the conventional ring-back tone service method provides a uniform tone, so that an originator cannot determine whether an erroneous connection is made or not before the response of a terminator and various ring-back sound services consistent with the characteristics of users cannot be provided.

DISCLOSURE OF THE INVENTION

Accordingly, the present invention has been made keeping in mind the above problems occurring in the prior art, and an object of the present invention is to provide a method and apparatus for managing ring-back sounds, which is capable of providing both a common ring-back sound service and an individual ring-back sound service without hindrance even if the number of subscribers increases.

Another object of the present invention is to provide a method of presenting ring-back sounds in a subscriber-based ring-back sound service, which allows a ring-back sound to be presented to a subscriber in the subscriber-based ring-back sound service, which provides with originators with a ring-back sound, registered and selected by a terminating subscriber, instead of an existing ring-back tone, so that the originators can determine whether erroneous connections are made or not and various ring-back sounds consistent with the characteristics of terminating subscribers can be provided.

Another object of the present invention is to provide a method of changing ring-back sounds in a subscriber-based ring-back sound service, which allows an originating subscriber to select the ring-back sound of a terminating subscriber, to which the originating subscriber listens, and set the ring-back sound of the terminating subscriber for hisser substitute ring-back sound in the subscriber-based ring-back sound service.

In order to accomplish the above object, the present invention provides a method of managing ring-back sounds in a subscriber-based ring-back sound service, including the first step of storing common ring-back sounds and reporting details of use of the common ring-back sounds to a ring-back sound management server, in each of Intellectual Peripherals (IPs); the second step of storing individual ring-back sounds and reporting details of use of the individual ring-back sounds to the ring-back sound management server, in each of large capacity storage devices connecting and interworking with one or more IPs; and the third step of statistically compiling the reported details of use of the common and individual ring-back sounds and determining whether to maintain storage of the common and individual ring-back sounds based up the statistically complied details, in the ring-back sound management server.

The method further includes the step of requesting the IP or large capacity storage device to delete a ring-back sound determined at the third step so that the ring-back sound is deleted, or the step of requesting the IP to remove a ring-back sound determined at the third step so that the ring-back sound is removed from the IP to the large capacity storage device, after the third step.

In order to accomplish the above object, the present invention provides an apparatus for managing ring-back sounds in a subscriber-based ring-back sound service system, the subscriber-based ring-back sound service system having ring-back sound provision means for storing a variety of ring-back sounds, connecting with Mobile Switching Centers (MSCs) of a mobile communications network via the gateway and providing the stored ring-back sounds to the MSCs; ring-back sound provision control means for communicating with the IP via the Internet and specifying a kind of a ring-back sound to be provided to the MSCs based upon a combination of identification of a terminating subscriber that a call connection is requested to reach, identification of an originator corresponding to the identification of the terminating subscriber, and information on a time band in which the request of the call connection is made; a Web server for connecting with the ring-back sound provision means or ring-back sound provision control means via the Internet, and adding ring-back sounds to the ring-back sounds stored in the ring-back sound provision means or changing ring-back sound specifying information of the ring-back sound provision control means; a Home Location Register (HLR) for storing first information about whether to substitute for an existing ring-back tone and second information for performing routing to the ring-back sound provision means as profile information of a terminating subscriber; the MSCs for receiving and storing the established first and second information while communicating with the HLR at a time of registering a location of the terminating subscriber, receiving a ring-back sound while communicating with the ring-back sound provision means based upon the first and second information, and providing the received ring-back sound to the corresponding originator, instead of the existing ring-back sound, including ring-back sound provision means for storing common ring-back sounds; large capacity storage devices each interworking with one or more ring-back sound provision means; and ring-back sound management server for statistically compiling the reported details of use of the common and individual ring-back sounds, determining whether to maintain storage of the common and individual ring-back sounds based up the statistically complied details, requesting the ring-back sound provision server or large capacity storage device to delete a determined ring-back sound so that the ring-back sound is deleted therefrom, and requesting the IP to remove a determined ring-back sound so that the ring-back sound is removed from the IP to the large capacity storage device.

In order to accomplish another object, the present invention provides a method of presenting ring-back sounds in a subscriber-based ring-back sound service, the subscriber-based ring-back sound service being performed in such a way as to store a plurality of ring-back sounds corresponding to ring-back (sound codes in ring-back sound provision means constructed to be linked to a mobile communications network, and provide originators with a ring-back sound corresponding to a ring-back sound code selected by a terminating subscriber with respect to each of originators, originator groups, originating time bands and default, including the first step of providing ring-back sound code information of the ring-back sound selected by a presenter and subscriber information of a presentee to the ring-back sound provision means; the second step of transmitting a message notifying ring-back sound presentation, including call-back information, to a mobile terminal of the presentee in a short message form via a Short Message Service (SMS) server of the mobile communications network based upon the subscriber information of the presentee; and the third step of selecting the condition information while communicating with the ring-back sound presentation server according to the call-back information, and providing the selected condition information from the ring-back sound presentation server to the ring-back sound provision means.

At the first step, the selecting of a ring-back sound is performed based upon voice communication or data communication, the voice communication is performed based on an ARS service, and the data communication is performed based on Web or WAP.

The ring-back sound provision means stores the provided ring-back sound information in an inactive storage space of a corresponding subscriber, activates the provided ring-back sound information according to the provided condition information, and uses the activated ring-back sound information as a substitute ring-back sound. In this case, the inactive storage space stores one or more ring-back sound codes, and causes a new ring-back sound to be overwritten on an oldest ring-back sound when having no available space.

In order to accomplish another object, the present invention provides an apparatus for presenting ring-back sounds in a subscriber-based ring-back sound service, the subscriber-based ring-back sound service providing a ring-back sound selected by a terminating subscriber to originators, including a ring-back sound provision means constructed in conjunction with a mobile communications network to store a plurality of ring-back sounds corresponding to ring-back sound codes, and provide a ring-back sound corresponding to a ring-back sound code selected by a presenter according to condition information regarding originators, originator groups, originating time bands and default, instead of an existing ring-back tone; a ring-back sound presentation means interworking with the ring-back sound provision means via the Internet to provide ring-back sound code information of the ring-back sound selected by the presenter and subscriber information of the presentee, transmit a message notifying ring-back sound presentation, including call-back information, to a mobile terminal of the presentee in a short message form via a SMS server based upon the subscriber information of the presentee, cause condition information to be selected through the mobile terminal of the presentee based upon the call-back information, and provide the selected condition information to the ring-back sound provision means; and a communication intermediation means for intermediating voice or data communication between the ring-back sound provision means and a terminal of the presenter.

The communication intermediation means may be formed of one or a combination of an Automatic Response Service (ARS) server for intermediating voice communication between the ring-back sound provision means and a terminal of the presenter, WAP server for intermediating data communication between the ring-back sound provision means and the terminal of the presenter based on a wireless Internet, and a Web server for intermediating data communication between the ring-back sound provision means and the terminal of the presenter based on a wired Internet.

The ring-back sound provision means is provided with an inactive storage space and an active storage space, stores the provided ring-back sound code information in the inactive storage space of the presentee, remove and store the provided ring-back sound code information to and in the active storage space to be activated, and provide a ring-back tone corresponding to the ring-back sound code information stored in the active storage space. The ring-back sound provision means is provided with the inactive storage space constructed to store plural pieces of ring-back sound information, and overwrites new ring-back sound information on oldest ring-back sound information when the inactive storage space has no available space.

In order to accomplish another object, the present invention provides a method of changing ring-back sounds in a subscriber-based ring-back sound service, including the fist step of providing first information about whether to substitute for an existing ring-back tone and second information for performing routing to an ring-back sound provision means, preset in a Home Location Register (HLR) at a time of registering a location of a terminating subscriber, from the HLR to a corresponding terminating MSC; the second step of providing a ring-back sound to a corresponding originator or requesting a trunk call connection from the ring-back sound provision means in response to the provided first and second information when perceiving that an originating MSC requests a call connection to the terminating subscriber, in the terminating MSC; the third step of search for a ring-back sound code preset in connection with a phone number of the terminating subscriber after performing the trunk call connection in response to the request of the trunk call connection, and providing a ring-back sound corresponding to the searched ring-back sound code to the originator via the connected terminating MSC, instead of the ring-back tone, in a ring back sound provision control means; the fourth step of requesting disconnection of the truck call connection from the ring-back sound provision means when perceiving that the terminating subscriber answers the call in the terminating MSC, and disconnecting the trunk call connection in response to the request of the trunk call disconnection by the ring-back sound provision means; the fifth step of creating a message, including a special number, a terminating phone number and an originating phone number, based upon information of the special number selected by the originator while trying a phone call and transmitting this message to the HLR, in the originating MSC; the sixth step of transmitting a message requesting change of a ring-back sound code to the ring-back sound provision control means in response to the received message in the HLR; and the seventh step of substituting the ring-back sound code preset in connection with the terminating phone number for a ring-back sound code preset in connection with the originating phone number in response to the message requesting change of a ring-back sound code, in the ring-back sound provision control server.

Communication between the HLR and the ring-back sound provision control means is performed based upon Internet Protocol, and the message created in the originating MSC and transmitted to the HLR at the fifth step is formed of a feature request Mobile Application Protocol (Feature Request MAP).

If the ring-back sound provision control means comprises a plurality of ring-back sound provision control means, the HLR transmits the message requesting the change of the ring-back sound code to a first ring-back sound provision control means corresponding to the originating phone number at the sixth step, and the first ring-back sound provision control means inquires a ring-back sound code corresponding to the terminating phone number from a second ring-back sound provision control means corresponding to the terminating phone number and substitutes the ring-back sound code corresponding to the terminating phone number included in a response to the request for a ring-back sound code corresponding to the originating phone number. Communication between the ring-back sound provision means and the ring-back sound provision control means is performed based upon Internet Protocol.

In order to accomplish another object, the present invention provides a method of changing ring-back sounds in a subscriber-based ring-back sound service, the subscriber-based ring-back sound service being performed by the step of providing first information about whether to substitute for an existing ring-back tone and second information for performing routing to an ring-back sound provision means, preset in a Home Location Register (HLR) at a time of registering a location of a terminating subscriber, from the HLR to a corresponding terminating MSC; the step of providing a ring-back sound to a corresponding originator or requesting a trunk call connection from the ring-back sound provision means in response to the provided first and second information when perceiving that an originating MSC requests a call connection to the terminating subscriber, in the terminating MSC; the step of search for a ring-back sound code preset in connection with a phone number of the terminating subscriber after performing the trunk call connection in response to the request of the trunk call connection, and providing a ring-back sound corresponding to the searched ring-back sound code to the originator via the connected terminating MSC, instead of the ring-back tone, in a ring-back sound provision control means; and the step of requesting disconnection of the trunk call connection from the ring-back sound provision means when perceiving that the terminating subscriber answers the call in the terminating MSC, and disconnecting the trunk call connection in response to the request of the trunk call disconnection by the ring-back sound provision means; including the first step of storing information for performing routing to the ring-back sound provision control means in connection with a phone number of the subscriber, receiving phone number information of a first subscriber and phone number information of a second subscriber through ARS communication with the first subscriber, and transmitting a message requesting change of a ring-back sound code to a first ring-back sound provision control means corresponding to a phone number of the first subscriber, in an ARS server, and the second step of inquiring a ling-back sound code corresponding to the phone number of the second subscriber from a second ring-back sound provision control means corresponding to the phone number of the second subscriber according to information for performing routing to the second ring-back sound provision control means, and substituting the ring-back sound code corresponding to the phone number of the second subscriber for a ring-back sound code corresponding to the phone number of the first subscriber.

A mobile terminal of the first subscriber provides a phone number thereof and a phone number with which the mobile terminal recently made a call, to the connected ARS server as the phone number information of the first subscriber and the phone number information of the second subscriber, respectively. Alternatively, the phone number information of the first subscriber and the phone number information of the second subscriber are input through a mobile terminal of the first subscriber during the ARS communication.

BRIEF DESCRIPTION OF THE DRAWINGS

The above and other objects, features and other advantages of the present invention will be more clearly understood from the following detailed description taken in conjunction with the accompanying drawings, in which.

Figure 1:
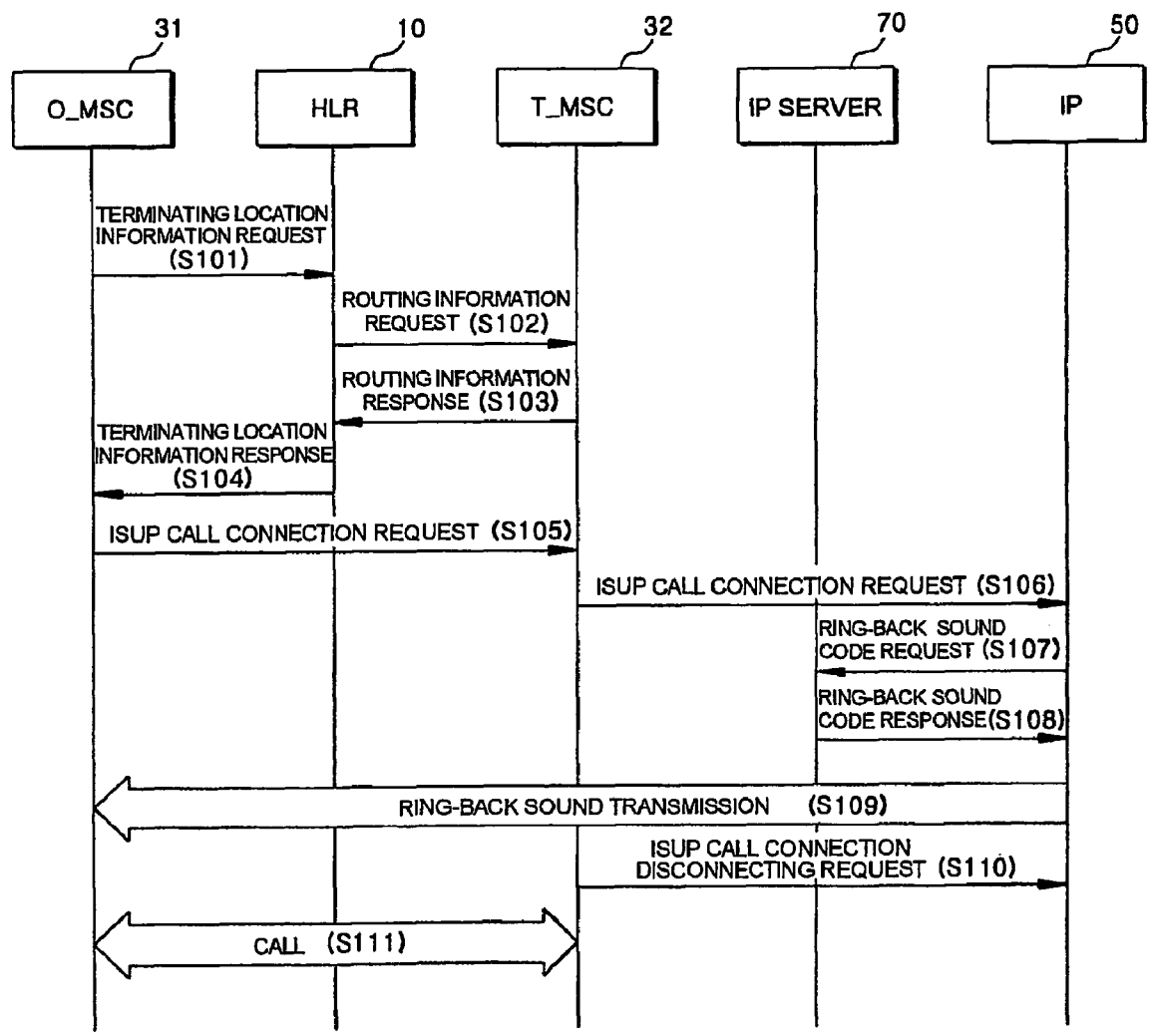
FIG. 1 is a flowchart showing a prior art subscriber-based ring-back sound service method.

DESCRIPTION OF REFERENCE NUMERALS
OF PRINCIPAL ELEMENTS OF DRAWINGS

10: HLR
20: No. 7 network
31, 32: MSC
40, 90: gateway
50: IP
60: Internet
70: IP server
80: subscriber DataBase (DB)
90: gateway
100: Web server
311, 312: large capacity storage device
320: ring-back sound management server
330: CP 701: Personal Computer (PC)
703, 705: mobile terminal
711: Web server
713: WAP server
715: ARS server
720: ring-back sound presentation server
730: IP server
740: SMS server

BEST MODE FOR CARRYING OUT THE INVENTION

A method and apparatus for managing ring-back sounds in accordance with a preferred embodiment of the present invention is described in detail with reference to the accompanying drawings below.

Figure 2:
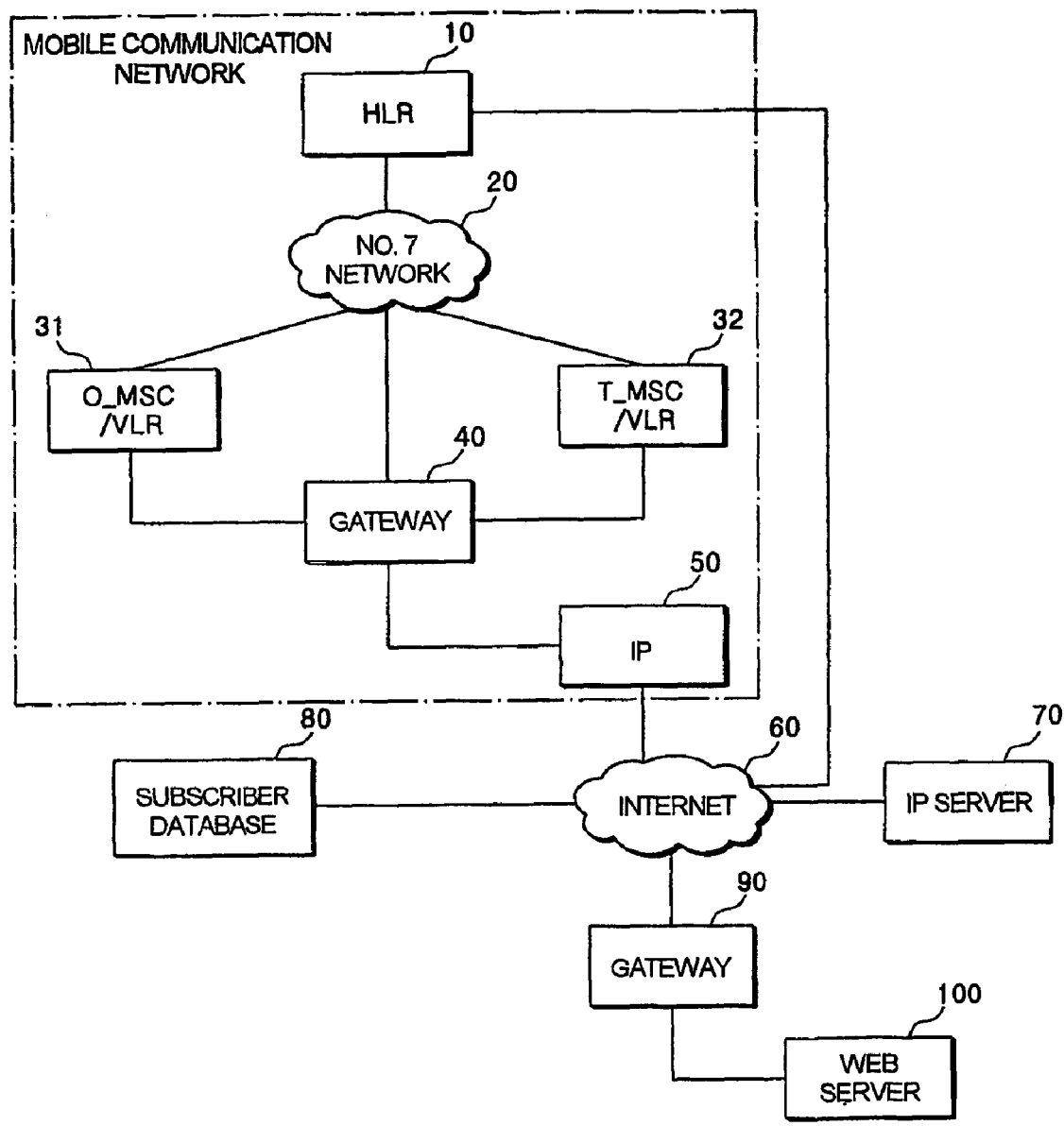
FIG. 2 is a basic configuration diagram of a subscriber-based ring-back sound service system to which the present invention is applied.

FIG. 2 is a basic configuration diagram of a subscriber-based ring-back (sound service system to which the present invention is applied. As described in this drawing, the subscriber-based ring-back sound service system includes a HLR 10, originating and terminating MSCs (O_MSC/VLR and T_MSC/VLR) 31 and 32 communicating with the HLR 10 via a No. 7 network 20 based on Signaling Transfer Protocol (STP), an IP 50 connecting with the No. 7 network 20 and communicating with the MSCs 31 and 32 via a gateway (CGS) 40, an IP server 70 data-communicating with the IP 50 via the Internet 60, a subscriber DB 80 connecting with the HLR 10 via the Internet 60, and a Web server 100 connecting with the Internet 60 via a gateway 90 and communicating with the IP 50 and the IP server 70.

The HLR 10 has its conventional functions as a network component, and additional functions of establishing and storing fist information about whether to substitute for an existing ring-back tone or not and second information for performing routing to the IP 50 in a subscriber profile. The information is established in the added service information of a terminating subscriber profile.

The MSCs 31 and 32 each have conventional functions as a network component, and additional functions of receiving and storing the established first and second information while communicating with the HLR 10 at the time of registering the location of a terminating subscriber, receiving a ring-back sound to be substituted for an existing ring-back tone while communicating with the IP 50 based upon the first and second information, and providing the received ring-back sound to the corresponding originator, instead of the existing ring-back sound.

The IP 50 stores a variety of ring-back sounds, connects with the MSCs 31 and 32 via the gateway 40 and provides the stored ring-back sounds to the MSCs 31 and 32.

The IP server 70 communicates with the IP 50 via the Internet 60 and specifies a ring-back sound to be provided to the MSCs 31 and 32 based upon a combination of the identification of a terminating subscriber to which a requested call connection reaches, the identification of an originator, and the information of a time band in which the request of the call connection is made (with respect to each of originators, originator groups, originator ages, originator genders, originator vocations, calling time bands and/or the like). For example, if codes are allocated to various ring-back sounds stored in the IP 50, a terminating subscriber selects originators, originator groups, calling time bands or the like at the time of subscribing to the service or changing information and specifies ring-back sounds corresponding to the above-selected items and the information of the specified ring-back sounds is maintained in the form of a table or the like, the IP 50 is controlled so that a corresponding ring-back sound can be provided to the MSC 32 based upon the information of the table.

The Web server 100 connects with the IP 50 or IP server 70 via the Internet 60, and adds ring-back sounds to the ring-back sounds stored in the IP 50 or changes the ring-back sound specifying information (specified originators, originator groups and calling time bands) of the IP server 70 and the ring-back sound codes corresponding to the ring-back sound specifying information. The subscriber can perform these functions through a Web page provided by the Web server 100.

The operation of the service system of FIG. 2 is described below.

When a person requests a specific ring-back sound transmission service from a service provider to which the person belongs, the person registers with the subscriber DB 80 of the service provider, the subscriber DB 80 of the service provider registers the service in the HLR 10 that is a network component, the HLR 10 establishes the service in the subscriber DB thereof, the HLR 10 transmits service establishment information and data for performing routing to the IP 50 to the currently serving MSC 32 at the time of registering a location, and the MSC 32 establishes the received service establishment information and routing data in the added service data of the corresponding terminating subscriber. Accordingly, when the originator requests a call establishment from a corresponding terminating subscriber, the terminating MSC 32 detects the establishment of the specific ring-back sound transmitting service, and notifies the terminating subscriber of the inflow of an incoming call while performing a call connection to the IP 50 using the routing data. In this case, the IP 50 inquires which ring-back sound the terminating subscriber has specified from the IP server 70, and the IP server 70 returns a code corresponding to the ring-back sound specified by the terminating subscriber to the IP 50. The IP 50 transmits the ring-back sound corresponding to the code instead of an existing ring-back tone so that the originator can listen to the ring-back sound until the terminating subscriber answers the phone. When the terminating subscriber responds to the incoming call, the terminating MSC 32 disconnects a call path to the IP 50 and connects the originator and the terminating subscriber to process the call.

[Method and Apparatus for Managing Ring-back Sounds]

Figure 3:
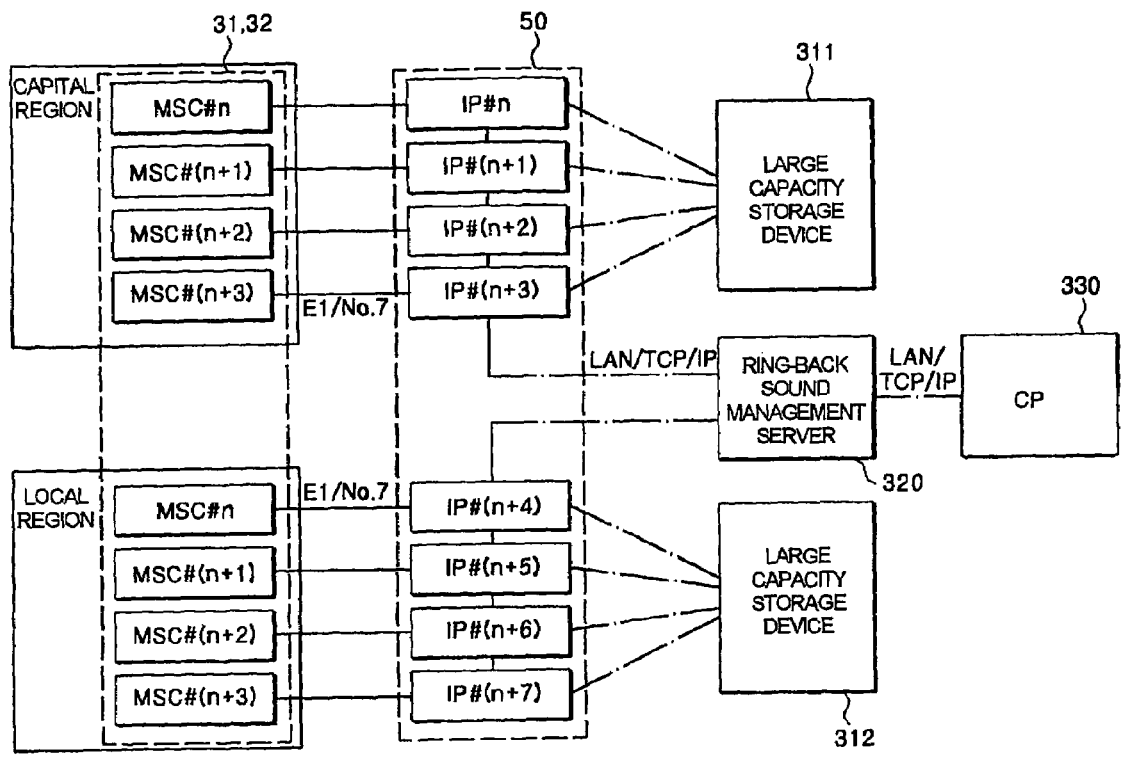
FIG. 3 is a network configuration diagram of an apparatus for managing ring-back sounds in the subscriber-based ling-back sound service in accordance with a preferred embodiment of the present invention.

FIG. 3 is a network configuration diagram of an apparatus for managing ring-back sounds in the subscriber-based ring-back sound service, which is described using the same reference numerals used to designate the same elements in FIG. 2 because the apparatus is constructed based upon the system of FIG. 2.

As illustrated in that drawing, IPs (IP#n to IP#(n+7)) 50 are connected to MSCs (MSC#n, MSC#(n+1), MSC#(n+2) and MSC#(n+3)) geographically distributed across the country, respectively, large capacity storage devices 311 and 312 are each connected to a plurality of adjacent IPs (IP#n to IP#(n+7)) 50 to interwork with each other, a ring-back sound management server 320 is connected to the IPs 50 and the large capacity storage devices 311 and 312 via a Local Area Network (LAN) or the Transmission Control Protocol/Internet Protocol (TCP/IP)-based Internet to communicate with each other, and a CP 330 is connected to the ring-back sound management server 320 via the LAN or the TCP/IP-based Internet to communicate with each other.

Each of the IPs 50 not only has all the functions described in conjunction with FIG. 2 but it also is provided with a disc for storing ring-back sounds, and stores, transits and deletes a certain number of common ring-back sounds, that is, common ring-back sounds provided by the CP 330.

The large capacity storage devices 311 and 312 each interwork with one or more IPs 50. The large capacity storage devices 311 and 312 are supplied with individual ring-back sounds, that is, individual ring-back sounds produced by the terminating subscriber via the Web server 100, from the CP 330, store the individual ring-back sounds, and can delete the individual ring-back sounds. The ring-back sound management server 320 statistically compiles the details of use of the common and individual ring-back sounds reported from the IPs 50 and the large capacity storage devices 311 and 312, determines whether to maintain the storage of the common and individual ring-back sounds based up the statistically complied details, requests the IP 50 or large capacity storage device 311 or 312 to delete a determined ring-back sound so that the ring-back sound is deleted therefrom, and requests the IP 50 to remove a determined ring-back sound therefrom so that the ring-back sound is removed from the IP 50 to the large capacity storage device 311 or 312.

Communication between the IP 50 and the large capacity storage devices 311 and 312 is preformed through the TCP/IP-based Internet, a LAN, or a combination of these.

Figure 4:
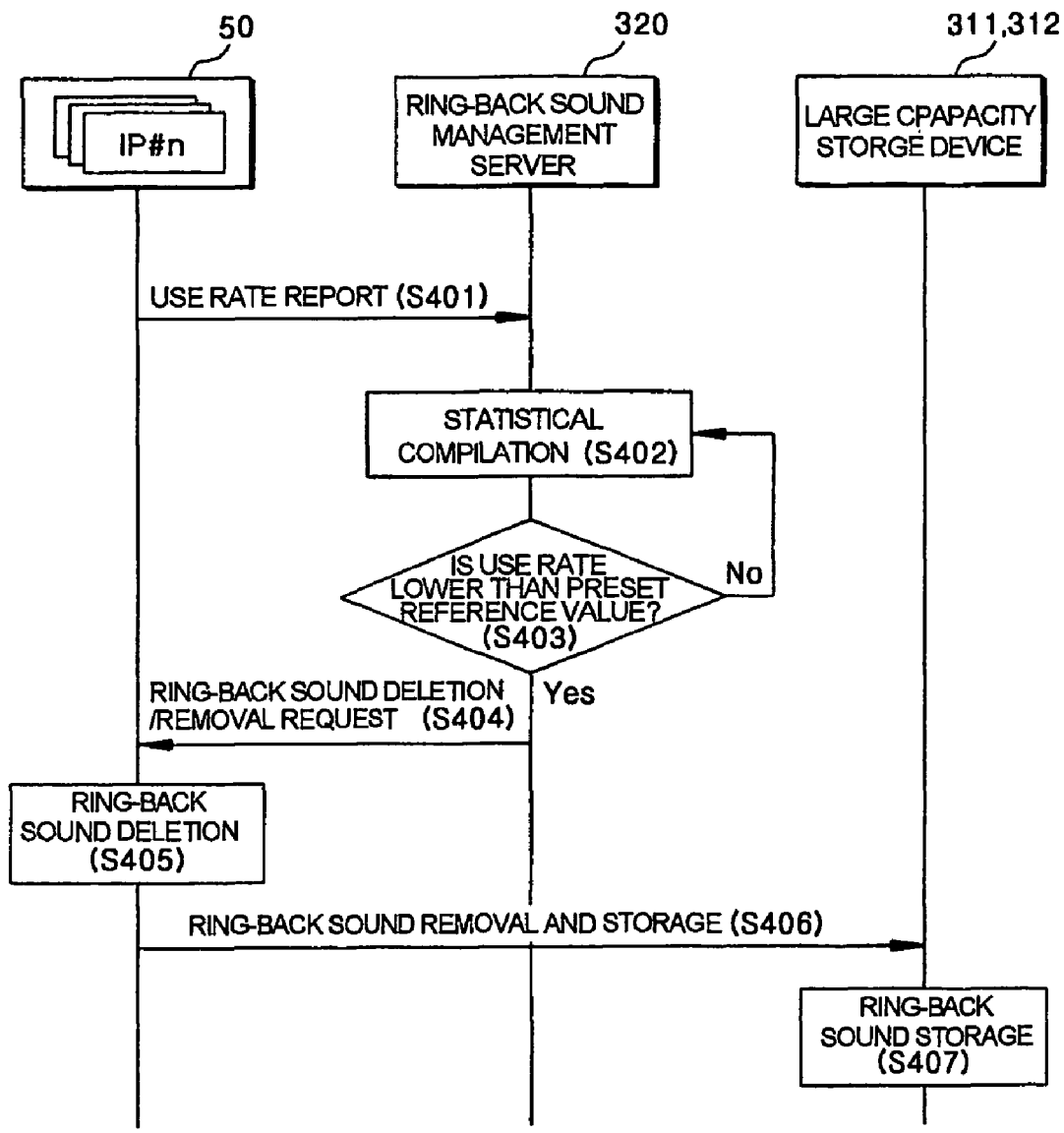
FIGS. 4 and 5 are flowcharts showing a method of managing ring-back sounds in the subscriber-based ring-back sound service in accordance with a preferred embodiment of the present invention.

FIG. 4 is a flowchart showing a method of managing ring-back sounds in the subscriber-based ring-back sound service in accordance with a preferred embodiment of the present invention, which illustrates the method of managing common ring-back sounds stored in the IP 50 of FIG. 3.

Each of the IPs (IP#n to IP#(n+7)) 50 periodically (daily or weekly) reports the details of use of the common ring-back sounds, including the rates of use, to the ring-back sound management server 320 at step S401. The ring-back sound management server 320 statistically compiles the details of use of the common ring-back sounds with respect to each of the common ring-back sounds by adding the details of use of each of the common ring-back sounds based upon the report of step S401 and arranges the details of use of the common ling-back sounds in the order of magnitude at step S402.

The ring-back sound management server 320 selects ring-back sounds having the details of use lower than a preset reference value (for example, ring-back sounds that have not been used for a certain period of time, or have rates of use lower than a certain value) based upon the statistically compiled details of use at step S403. Thereafter, the ring-back sound management server 320 requests the deletion and removal of ring-back sounds from the respective IPs (IP#n to IP#(n+7)) 50 at step S404. Whether to delete or remove ring-back sounds is determined according to another preset reference value, or by various methods, such as a method in which selected ring-back sounds having a rate of use of zero are deleted and the other selected ring-back sounds are removed.

The respective IPs (IP#n to IP#(n+7)) 50 perform the deletion or removal of the selected ring-back sounds in response to the request of step S404. When the deletion of the ring-back sounds is requested, the IPs 50 delete the ring-back sounds stored therein at step S405. When the removal of the selected ring-back sounds is requested, the IPs 50 remove and store the selected ring-back sounds to and in corresponding large capacity storage devices 311 and 312 at steps 406 and 407.

Figure 5:
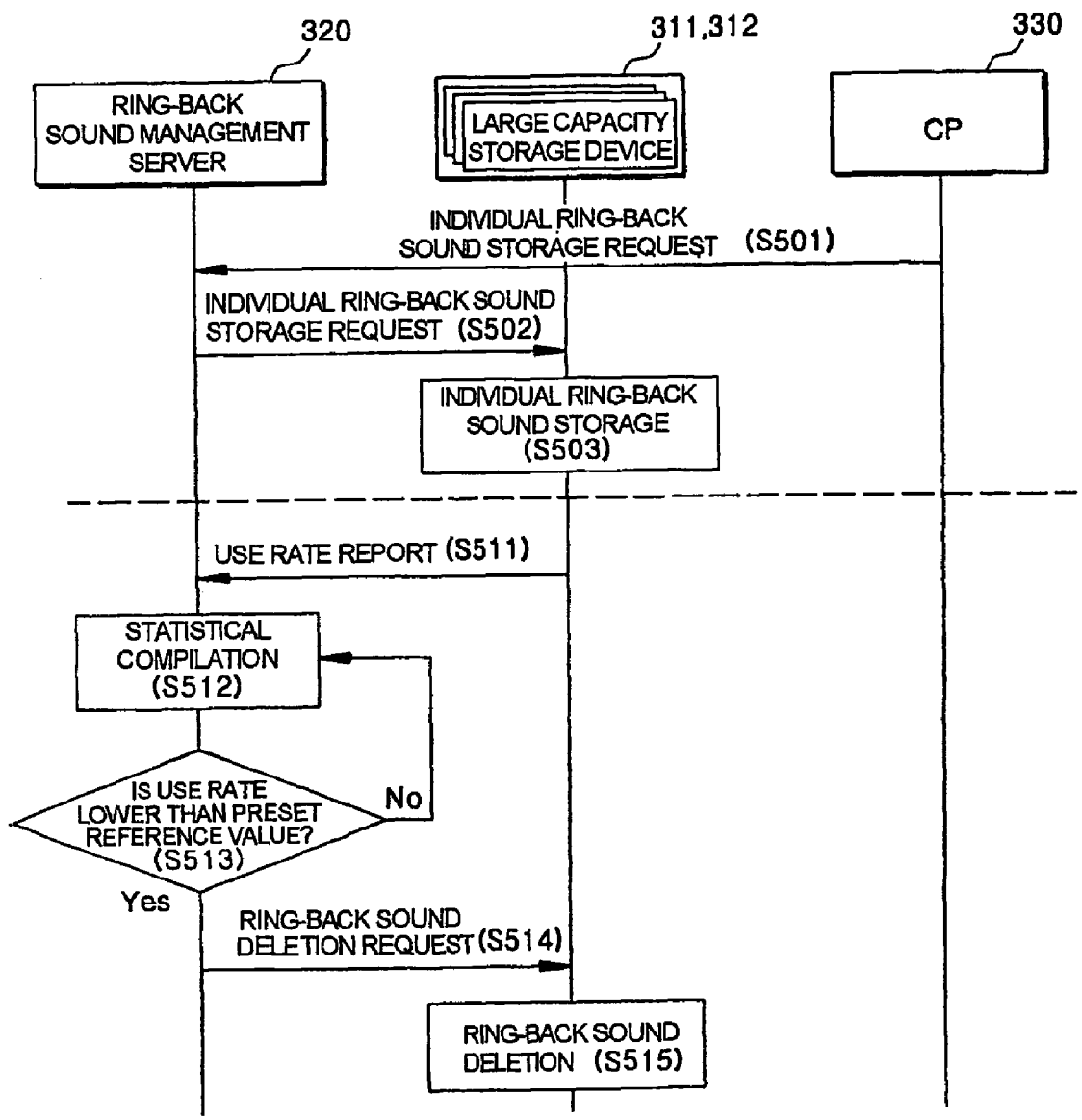

FIG. 5 is a flowchart showing a method of managing ring-back sounds in the subscriber-based ring-back sound service in accordance with an embodiment of the present invention, which illustrates the method of managing individual ring-back sounds stored in the large capacity storage devices 311 and 312.

The CP 330 requests the ring-back sound management server 320 to store individual ring-back sounds recorded and edited by the terminating subscriber on the Internet at step S501, the ring-back sound management server 320 requests the large capacity storage devices 311 and 312 to store these individual ring-back sounds in response to the request of step S501 at step S502, and the large capacity storage devices 311 and 312 store these individual ring-back sounds in response to the request of step S502 at step S503.

The large capacity storage devices 311 and 312 periodically (for example, daily or weekly) reports the details of use of the individual ring-back sounds, including the rates of use of the individual ring-back sounds, at step S511, and the ring-back sound management server 320 statistically compiles the rates of use of the individual ring-back sounds by adding the rates of use with respect to each of the individual ring-back sounds based upon the report of step S511 and arranges the added rates of use in order of magnitude at step S512.

Thereafter, the ring-back sound management server 320 selects ring-back sounds having the rates of use lower than a preset reference based upon the statistically compiled rates of use at step S513, requests the large capacity storage devices 311 and 312 to delete the selected ring-back sounds at step S514, and the large capacity storage devices 311 and 312 deletes the selected ring-back sounds stored therein in response to the request of step S514 at step S515.

Figure 6:
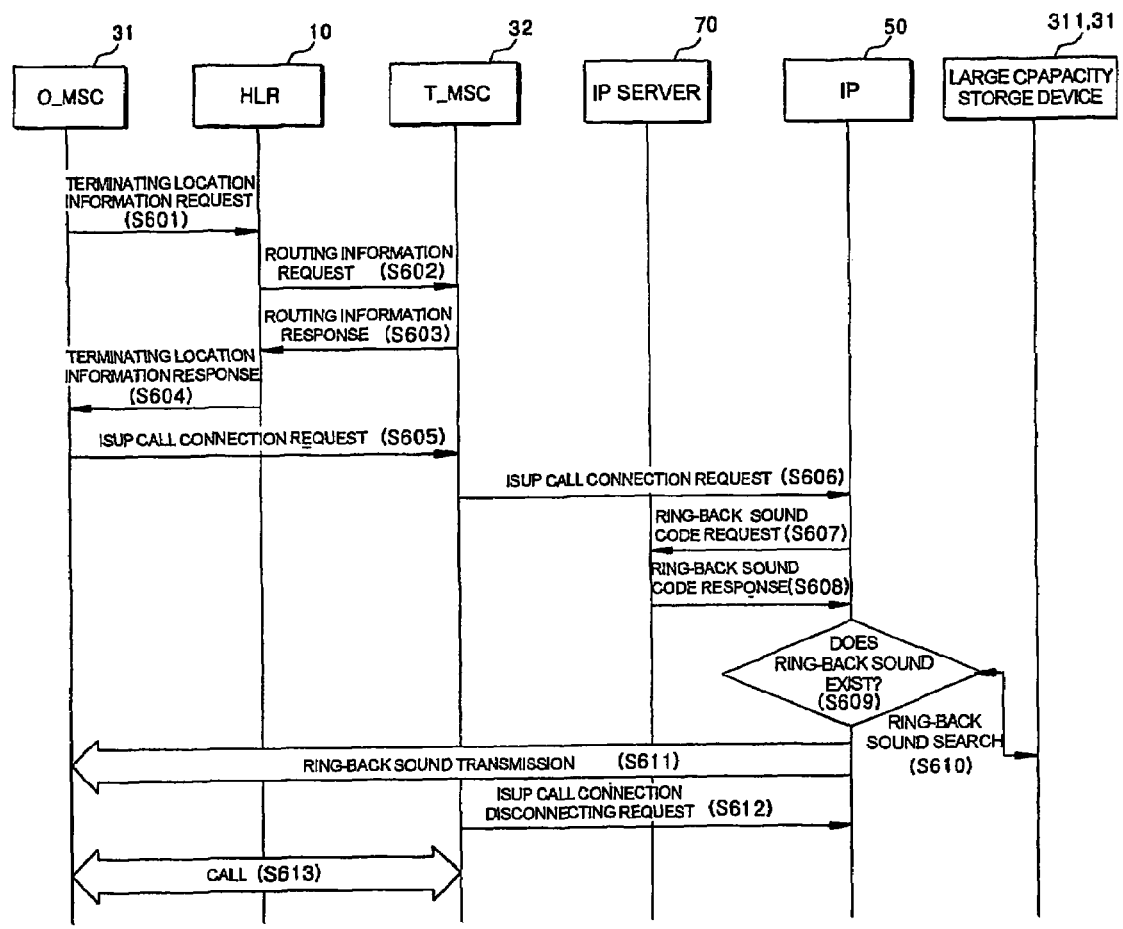
FIG. 6 is a flowchart showing a subscriber-based ring-back sound service method to which the ring-back sound managing method has been applied in accordance with a preferred embodiment of the present invention.

FIG. 6 is a flowchart showing a subscriber-based ring-back sound service method to which the ring-back sound managing method has been applied in accordance with a preferred embodiment of the present invention.

When an originator calls a terminating subscriber and requests a call connection, a corresponding originating MSC 31 requests terminating location information from the HLR 10 at step S601. The HLR 10 requests routing information from the terminating MSC 32 at step S602, and the terminating MSC 32 responds to the request of step S602 by providing the routing information (that is, Temporary Local Directory Number (TLDN)) to the HRL 10 at step S603.

The HRL 10 responds to the request of step S601 by transmitting the routing information to the originating MSC 31 at step 604. Thereafter, the originating MSC 31 requests an ISUP call connection from the terminating MSC 32 based upon the routing information to establish a call path at step S605.

Thereafter, if it is determined that a terminator is a subscriber to the service of the present invention and the service is activated based upon service establishment information and information for performing routing to an IP 50 provided by the HLR 10 and previously stored in the terminating MSC 32 at the time of registering the location, the terminating MSC 32 requests an ISUP call connection from the IP 50 to establish a trunk call path and, at this time, provides both a terminating phone number and an originating phone number at step S606. As a result, the call paths are established among the originating MSC 31, the terminating MSC 32 and the IP 50. For reference, the service establishment information and the routing information are included in a location registration response message downloaded from the HRL 10 to the terminating MSC 32, and are provided to the terminating MSC 32.

The IP 50 inquires a ring-back sound code from the IP server 70 based upon the provided terminating and originating phone numbers at step S607, and the IP server 70 searches for the ring-back sound code allocated in connection with the provided terminating and originating phone numbers and transmits the searched ring-back sound code to the IP 50 in response to the inquiry of step S607 at step S608.

The IP 50 transmits a ring-back sound corresponding to the received ring-back sound code, instead of a ring-back tone, to the originator through the established call path. In this case, the IP 50 determines whether it has the received ring-back sound code and a corresponding ring-back sound at step S609, and transmits the ring-back sound searched in the connected large capacity storage devices 311 and 312 to the originator through the established call path if the corresponding ring-back sound does not exist in the IP 50 at step S610, or the ring-back sound existing in the IP 50 to the originator through the established call path if the corresponding ling-back sound exists in the IP 50 at step S611.

Finally, when the terminating subscriber answers the phone while the ring-back sound is being transmitted to the originator, the terminating MSC 32 requests the IP 50 to disconnect the ISUP call connection so that the IP 50 can disconnect the ISUP call connection at step S612, and, at the same time, allows the originator and the terminating subscriber to make a call through the call path established between the originating MSC 31 and the terminating MSC 32 at step S613.

[Method and Apparatus for Presenting Ring-back Sounds]

A method and apparatus for presenting a ring-back sound in the subscriber-based ring-back sound service in accordance with a preferred embodiment of the present invention is described in detail with reference to the accompanying drawings below.

The ring-back sound presenting method of the present invention is described in conjunction with the operation of the system of FIG. 2 because the ring-back sound presenting method of the present invention is applied to the system of FIG. 2.

Figure 7:
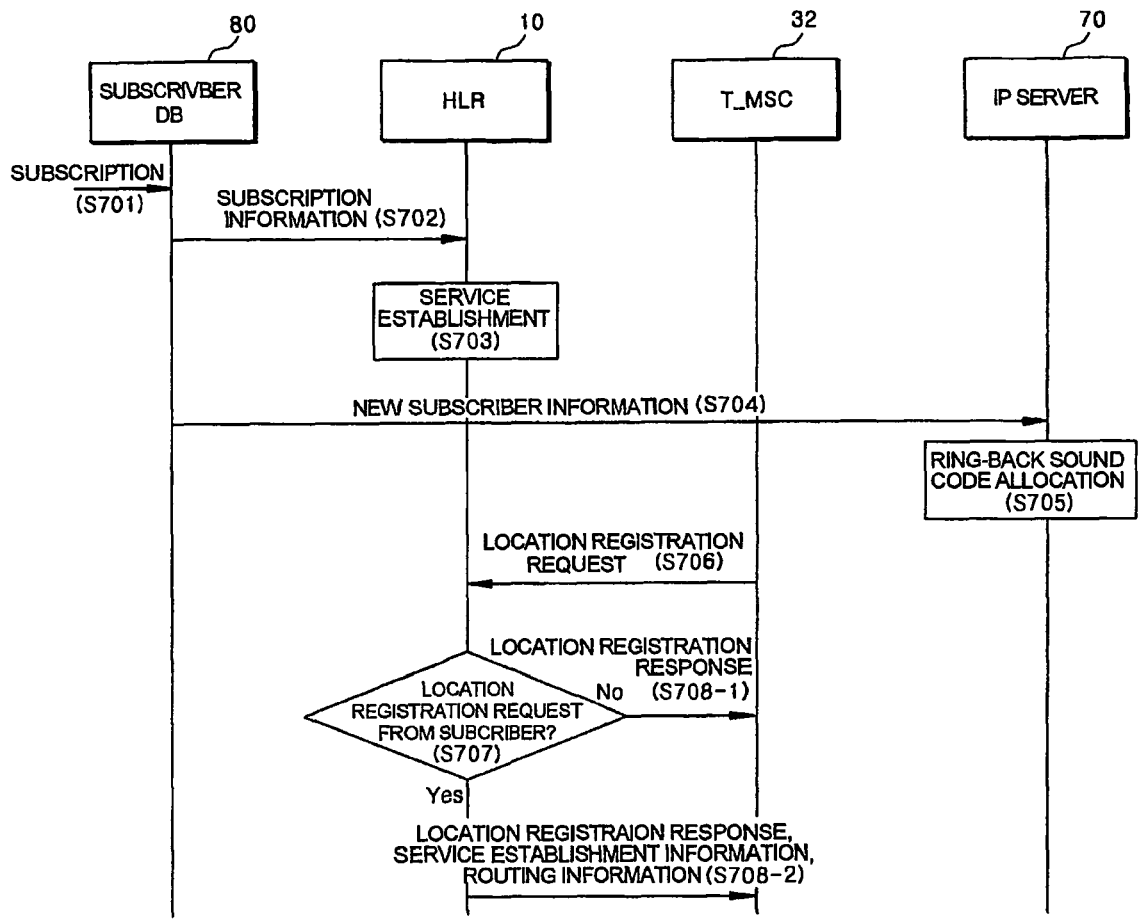
FIG. 7 is a flowchart showing a process of subscribing to a service in the ring-back sound presenting method of the present invention.

FIG. 7 is a flowchart showing a process of subscribing to a service in a method of presenting ring-back sounds in the subscriber-based ring-back sound service.

When a request for subscription to the service of the present invention, that is, the subscriber-based ring-back sound service, is made at step S701, the subscription of the requester (that is, the phone number of the requester) to the service is stored in the subscriber DB, and subscription information (including the phone number) is transmitted from the DB 80 to the HLR 10 at step S702, and the subscription of the requester to the service is stored in a corresponding subscriber profile of the HLR 10 at step S703. Additionally, new subscriber information, including the phone number of the new subscriber and the selected kind of a ring-back sound at the time of subscribing to the service, is transmitted from the DB 80 to the IP server 70 at step S704, and the IP server 70 allocates a code to the phone number of the new subscriber based upon the new subscriber information at step S705.

Meanwhile, at step S705, if information specifying different ring-back sounds with respect to each of originators, originator groups and time bands is included in the new subscriber information, different codes are allocated to these ring-back sounds.

Thereafter, when a location registration request message is uploaded from the terminating MSC 32, the HLR 10 determines whether the location registration request message is transmitted from the subscriber to the service of the present invention (that is, a terminal requesting a location registration has subscribed to the service of the present invention) by checking the subscriber profile at step S707, downloads a conventional location registration response message to the terminating MSC 32 if the location registration request message is not transmitted from the subscriber, and a location registration response message, including service establishment information and routing information (for example, a number for performing routing to the IP 50 (Routing Digits)), to the terminating MSC 32 so that the terminating MSC 32 can have the information at step S708-2.

Figures 11, 12:
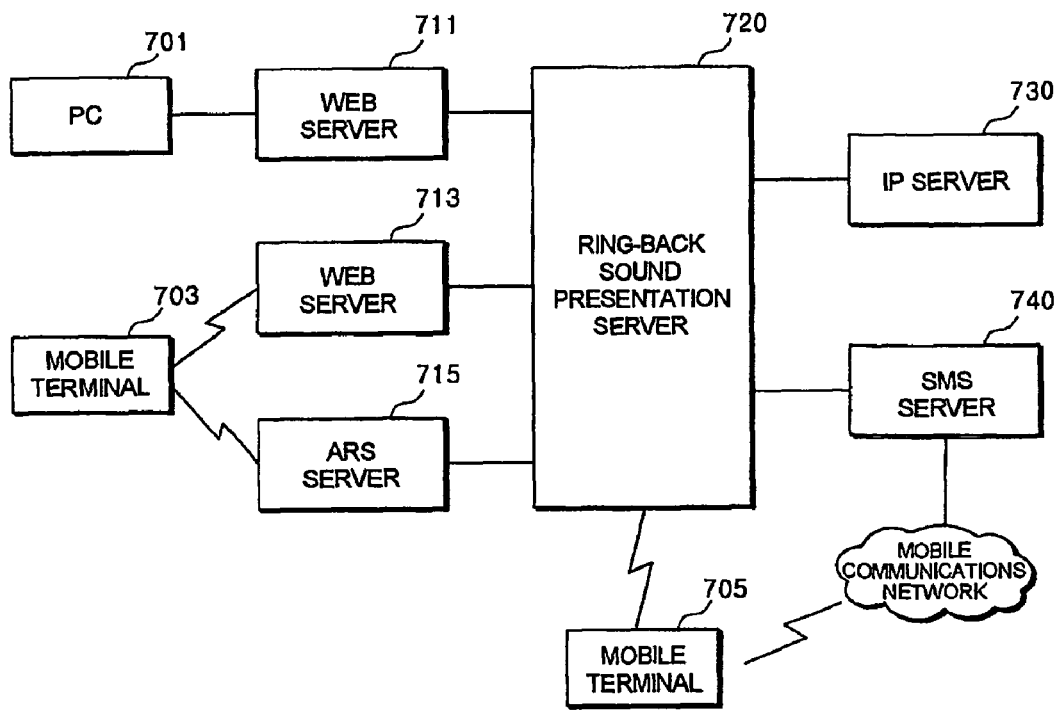
FIG. 11 is a diagram showing a format of an added service establishment message that is transmitted from a HLR to a terminating MSC in the ring-back sound presenting method of the present invention.
FIG. 12 is a configuration diagram of an apparatus for presenting ring-back sounds in accordance with an embodiment of the present invention.

An example of the method of transmitting the service establishment information is described below. As shown in FIG. 11, the service establishment information is included in the location registration response message in such a way as to be indicated in a the ring-back tone (Specific RingBack-Tone: SRBT) field in the form of 2-bit data (for example, '10' indicates the state in which subscription to the service is made but the service is inactivated, and '11' indicates the state in which subscription to the service is made and the service is activated) using the reserve field of an added service parameter (CallingFeaturesIndicator2) as the SRBT field, and is transmitted from the HLR 10 to the terminating MSC 32. For reference, in FIG. 11, a VMSB field indicates a Voice Mail Service Busy state, a VMSU field indicates a Voice Mail Service Busy Unconditional state, a VMSNA field indicates a Voice Mail Service Busy No Answer state, a FMSNA field indicates a Fax Mail Service No Answer state, a FMSB field indicates a Fax Mail Service Busy state, a FMSU field indicates a Fax Mail Service Unconditional state, a MC field indicates a Multi-call, a CC field indicates a conference call, and a MUDN field indicates a multiple unit director number, in the form of 2-bit data, respectively.

Figure 8:
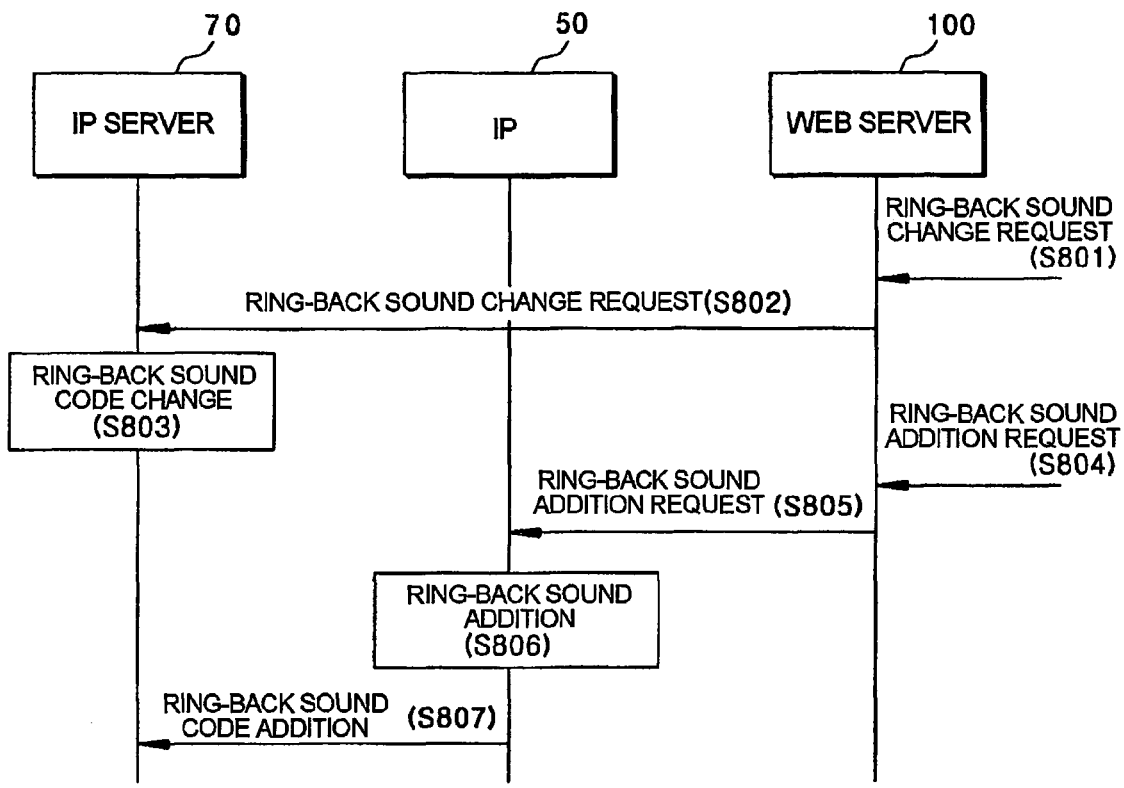
FIG. 8 is a flowchart showing a process of changing a service and adding a service to an existing service in the in ring-back sound presenting method of the present invention.

FIG. 8 is a flowchart showing a process of changing/adding a service in the subscriber-based ring-back sound service in accordance with the present invention.

When the subscriber having subscribed to the service according to the process of FIG. 7 as described above accesses an appointed Web server 100 using a PC, the Web server 100 provides a Web page, in which the service of the present invention is changed and is added, to the screen of the PC.

Accordingly, when the subscriber requests the change of a ring-back sound while selecting one ring-back sound from a list of ring-back sounds stored in the IP 50 after inputting his/her phone number through the Web page at step S801, the Web server 100 requests the IP server 70 to change an existing ring-back sound at step S802, and the IP server 70 cancels the code of the existing ring-back sound connected with the phone number of the subscriber in response to the request, and stores the code of the selected ring-back sound in connection with the phone number of the subscriber so that the selected ring-back sound, instead of the ring-back tone, can be provided to an originator that called the subscriber at step S803.

In the meantime, when the subscriber requests the addition of a ring-back sound while transmitting a voice guide file, a logo file or a certain music file to the Web server 100 together with his/her phone number at step S804, the Web server 100 requests the addition of the ring-back sound from the IP 50 at step S805, the IP 50 obtains the added ring-back sound in response to the request at step S806, and the IP server 70 allocates a code to the added ring-back sound to be connected with the phone number of the subscriber at step S807.

Figure 9:
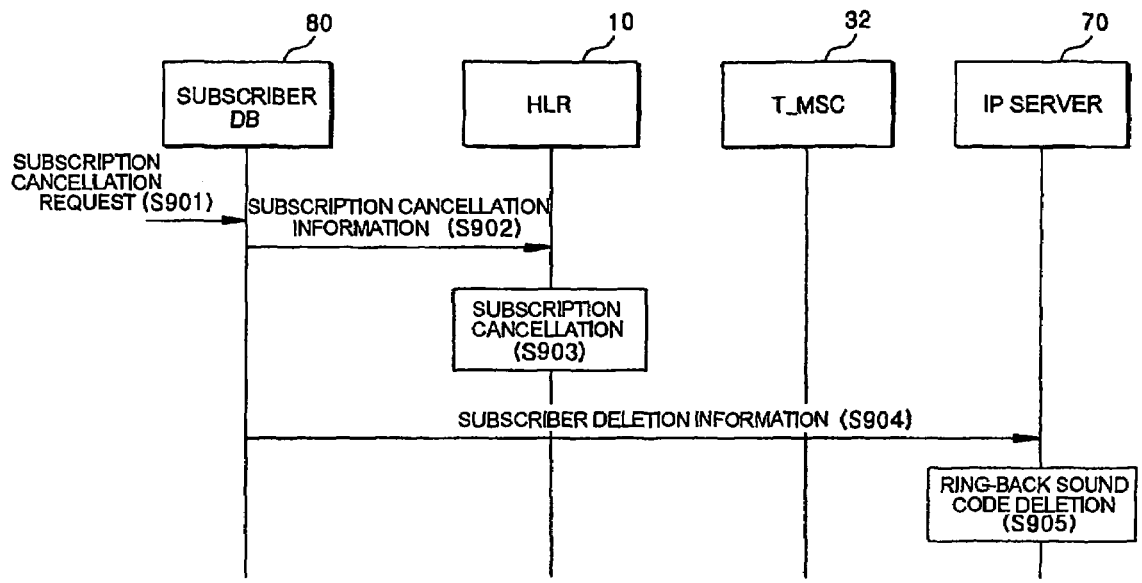
FIG. 9 is a flowchart showing a process of canceling subscription in the ring-back sound presenting method of the present invention.

FIG. 9 is a flowchart showing a process of canceling subscription to a service in the subscriber-based ring-back sound service.

When the subscriber requests the cancellation of subscription to the service of the present invention, that is, the subscriber-based ring-back sound service, at step S901, the subscriber DB 80 is updated to cancel the subscription of the subscriber to the service, cancellation information (including the phone number) is transmitted from the subscriber DB 80 to the HLR 10 at step S902, and the HLR 10 updates a corresponding subscriber profile to cancel the subscription to the service of the present invention at step S903. Additionally, the cancellation information, including the phone number, is transmitted from the DB 80 to the IP server 70 at step S904, and the IP server 70 cancels the allocated code based upon the transmitted cancellation information at step S905.

Figure 10:
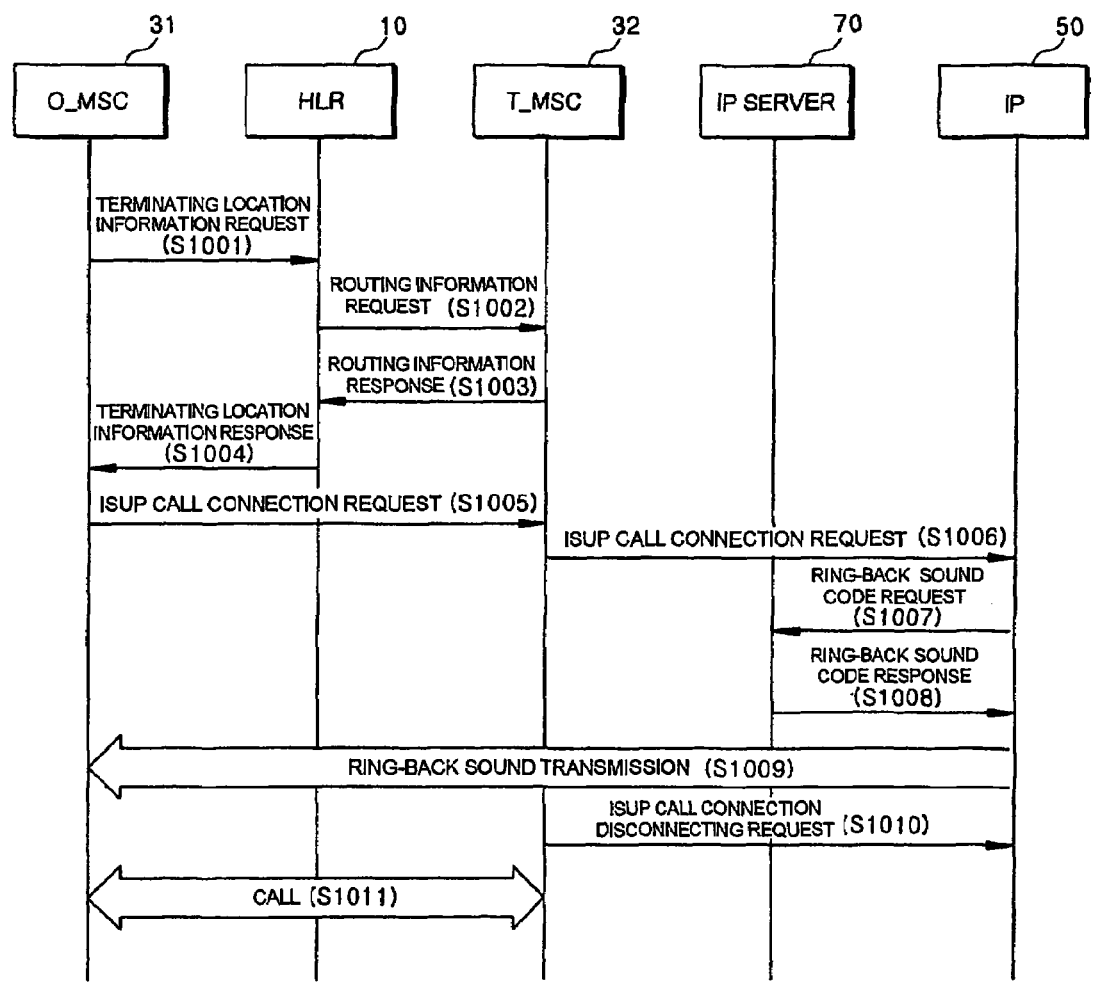
FIG. 10 is a flowchart showing an actual service process that is performed after the processes of FIGS. 7 and 8 are completed in the subscriber-based ring-back sound service in accordance with an embodiment of the present invention.

FIG. 10 is a flowchart showing an actual service process that is performed after the processes of FIGS. 7 and 8 are completed in the subscriber-based ring-back (sound service, in accordance with an embodiment of the present invention.

When an originator calls a terminating subscriber and requests a call connection, a corresponding originating MSC 31 requests terminating location information from a HLR 10 at step S1001.

The HLR 10 requests routing information from a terminating MSC 32 in response to the request at step S1002, and the terminating MSC 32 responds to this request by providing routing information (that is, Temporary Local Directory Number (TLDN)) to the HLR 10 at step S1003.

The HLR 10 transmits the routing information to the originating MSC 31 in response to the request of step S1001 at step S1004, and the originating MSC 31 requests an ISUP call connection from the terminating MSC 32 based upon the routing information to establish a call path at step S1005.

Thereafter, the terminating MSC 32 refers to the service establishment information stored therein (the SRBT field of FIG. 11 received and stored at step S708-2 of FIG. 7), recognizes that the terminator is a subscriber to the service of the present invention and the service is activated if '11' is indicated in the SRBT field, requests an ISUP call connection from the IP 50 based upon the routing information received and stored at the step S708-2 of FIG. 7 to establish a call path and, at the same time, provides a terminating phone number and an originating phone number at step S1006. As a result, the call paths are established among the originating MSC 31, the terminating MSC 32 and the IP 50.

The IP 50 requests the code of a ring-back sound from the IP server 70 based upon the provided terminating and originating phone numbers at step S1007, the IP server 70 responds to the request of step S1007 by searching for the code of the ring-back sound allocated in connection with the provided terminating and originating phone numbers and transmitting the searched code to the IP 50 at step S1008, and the IP 50 transmits a ring-back sound corresponding to the searched code to the originator through the established call path at step S1009.

When the terminating subscriber answers the phone while the ring-back sound is being transmitted to the originator, the terminating MSC 32 requests the IP 50 to disconnect the ISUP call connection so that the IP 50 disconnects the ISUP call connection at step S1010, and, at the same time, allows the originator and the terminating subscriber to make a call through the call path established between the originating MSC 31 and the terminating MSC 32 at step S1011.

In the meantime, in the subscriber-based ring-back sound service method of the present invention, the terminating subscriber accesses the HLR 10, and is allowed to change service establishment information indicated in the SRBT field of the HLR 10. For example, when the terminating subscriber pushes a certain appointed key using his/her mobile terminal the information of the key is transmitted to the HLR 10, and the HLR 10 2-bit information indicated in the SRBT field can be changed based upon the transmitted key information. However, since the first of 2 bits indicates whether subscription to the service of the present invention is made or not, it is not allowed to be changed. In contrast, since the second of the 2 bits indicates whether the service of the present invention is activated, it can be allowed to be changed. That is, for the subscribers, data indicated in the SRBT field can be two kinds, that is, '10' and '11.' The data '10' indicates that the service of the present invention is inactivated, while the data '11' indicates that the service of the present invention is activated. In this case, the data '11' can be changed to '10' and '10' to '11' by pushing the appointed key, so that he can decide if he/she uses the existing ring-back tone as it is, or the ring-back sound selected by him/her. Accordingly, when '10' is indicated in the SRBT field, the terminating MSC 32 allows the existing ring-back tone to be provided to the originator even though a terminator is a subscriber to the service of the present invention.

A method and apparatus for presenting a ring-back sound based upon the subscriber-based ring-back sound service in accordance with a preferred embodiment of the present invention is described in detail below.

FIG. 12 is a block diagram of the apparatus for presenting a ring-back sound in the subscriber-based ring-back sound service in accordance with the embodiment of the present invention. As described in this drawing, the ring-back sound presenting apparatus includes a Web server 711 for communicating with the PC 701 of a presenter via the wired Internet and allowing the presenter to select a ring-back sound that the presenter wants to present to a presentee, and to appoint the presentee (he should be a subscriber to the service of the present invention), a WAP server 713 for communicating with the mobile terminal 703 of the presenter via the wireless Internet and allowing the presenter to select the ring-back sound and appoint the presentee, an Automatic Response System (ARS) server 715 for voice-communicating with the mobile terminal 703 and allowing the presenter to select the ring-back sound and appoint the presentee in an ARS manner, a ring-back sound presentation server 720 for communicating with the Web server 711, the WAP server 713 and the ARS server 715, an IP server 730 for communicating with the ring-back sound presentation server 720 via the Internet, and a Short Message Service (SMS) server 740 for composing a short message from ring-back sound presentation notifying information provided by the ring-back sound presentation server 720 and transmitting the short message to the mobile terminal 705.

The ring-back sound presentation server 720 functions to download a list of ring-back sounds or the selected ring-back sound to the PC 701 or mobile terminal 703 according to a ring-back sound selection procedure programed in the Web server 711, the WAP server 713 and the ARS server 715 so that the presenter selects a ring-back sound that he/she wants to present, to receive information on the code of the ring-back sound selected by the presenter and presentee information (for example, the mobile phone number of the presentee) from the servers 711, 713 and 715 and recognize them, to transmit the recognized information to the IP server 730 and the message notifying ling-back sound presentation, which includes call back information and is composed in the form of a short message through the SMS server 740, to the mobile terminal 705 of the presentee based upon the presentee information so that the presentee can select condition information for specifying ring-back sounds with respect to each of originators, originator groups, originator ages, originator vocations and/or originating time bands through the mobile terminal 705 assessed according to the call-back information, and to transmit the selected condition information to the IP server 730. Further, the ring-back sound presentation server 720 has the same ring-back sounds in connection with the ring-back sound codes as the IP 50 of FIG. 2.

Figure 13:
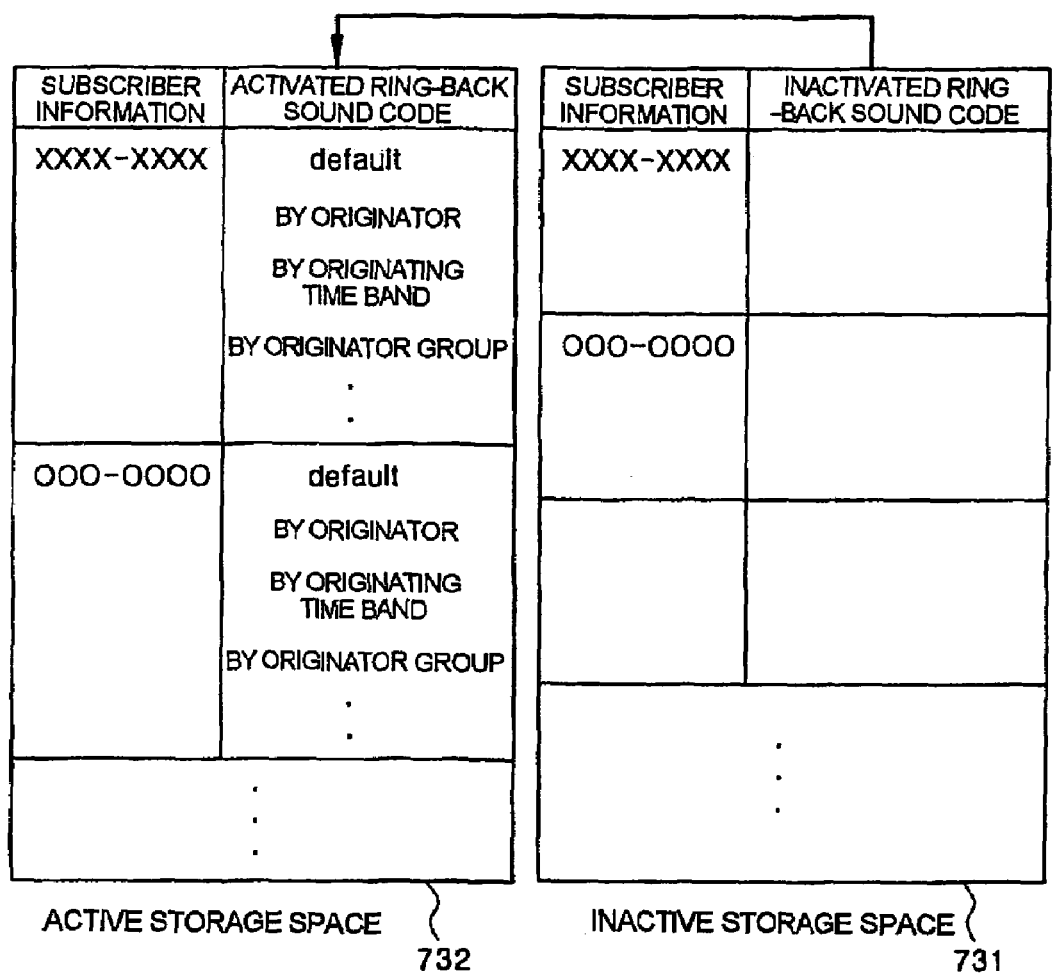
FIG. 13 is a diagram showing a storage space of an IP server of FIG. 11.

The IP server 730 performs the same function as the IP server 70 of FIG. 1. In particular, as shown in FIG. 13, the IP server 730 has an inactive storage space 731, and an active storage space 732 divided according to originators, originator groups, originator ages, originator genders, originator vocations and originating time bands. Code information provided by the ring-back sound presentation server 72 is maintained in the inactive storage space 731 of a corresponding subscriber (that is, a presentee) the code information is removed to the active storage space 732 to be activated according to the condition information, and the ring-back sound of the code stored in the active storage space 732 is used instead of a ring-back tone. The IP server 730 has the inactive storage space 731 capable of storing multiple (for example, six) pieces of code information. This is to provide for the case where the mobile terminal of the presentee is at a No Paging Response (NPR) state or power-off state. Meanwhile, when the inactive storage space 731 has no available space, ring-back sound code information provided by the ring-back sound presentation server 72 is allowed to be overwritten on the oldest code information.

Figure 14:
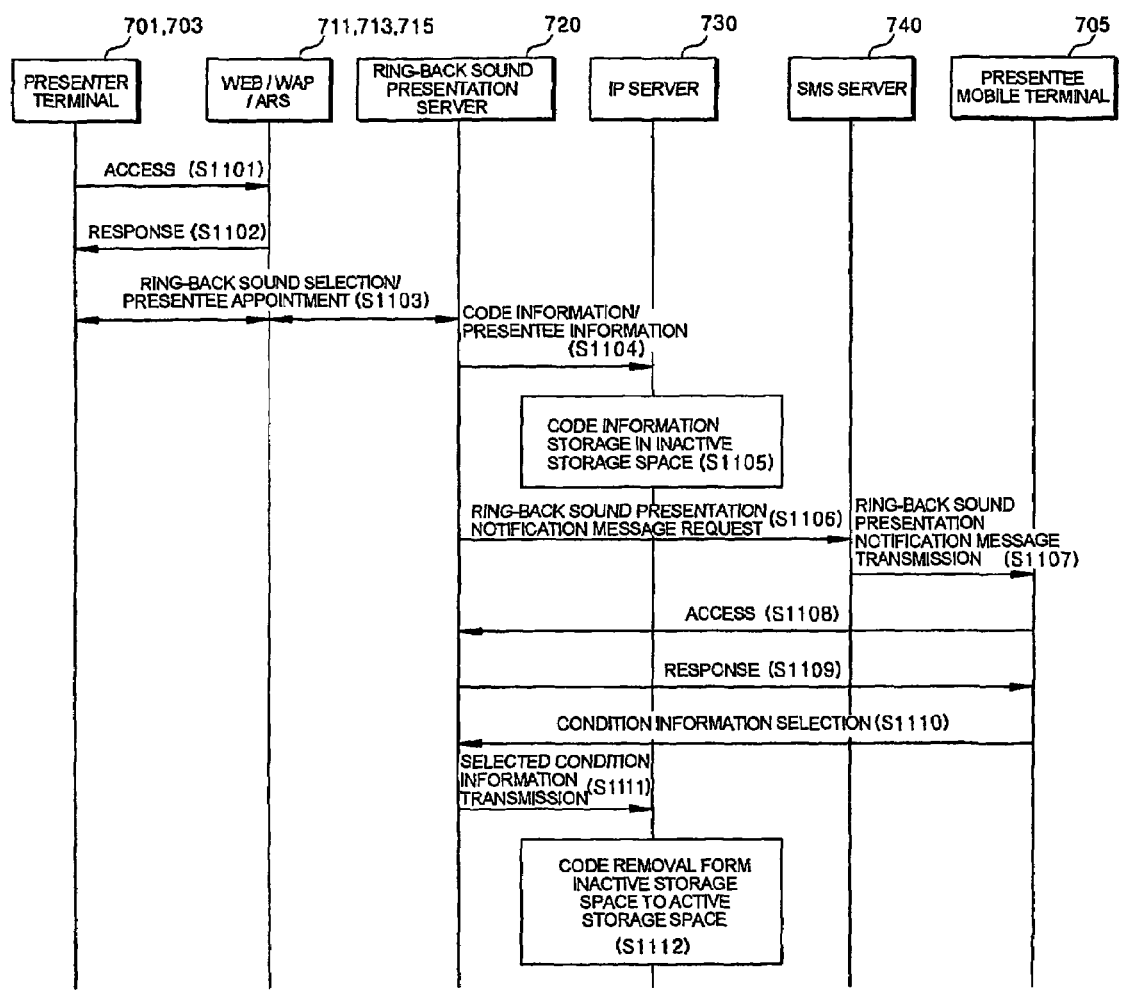
FIG. 14 is a flowchart showing a method of presenting ring-back sounds in the subscriber-based ring-back sound service in accordance with a preferred embodiment of the present invention.

FIG. 14 is a flowchart showing a method of presenting ring-back sounds in the subscriber-based ring-back sound service in accordance with a preferred embodiment of the present invention. Since this method is applied to the apparatus of FIG. 11, this method is described together with the operation of this apparatus.

A subscriber who wants to present a ring-back sound (presenter) accesses the Web server 711, WAP server 713 or ARS server 715 using the PC 701 or mobile terminal 703 as his/her terminal at step S1101. Thereafter, the Web server 711 downloads a Web page to the screen of the PC 701 to allow the presenter to select a ring-back sound and appoint a presentee, the WAP server 713 downloads WAP information to the screen of the mobile terminal 703 so that the presenter can select a ring-back sound and appoint a presentee, or the ARS server 715 transmits ARS information to the mobile terminal 703 in ARS voice so that the presenter can select a ring-back sound and appoint a presentee at step S1102.

When the presenter selects the ring-back sound and appoints the presentee while communicating with the server (711, 713 or 715) through the terminal (701 or 703), the selected ring-back sound and the appointed presentee are transmitted to and recognized by the ring-back sound presentation server 720 at step S1103. In this step, the ring-back sound presentation server 720 provides a ring-back sound, which the presenter wants to present, to the mobile terminal 703 in response to the request of the WAP server 713 or ARS server 715 so that the presenter listens to the ring-back sound and selects one ring-back sound for a present ring-back sound. For reference, the information of the appointed presentee is the phone number of the presentee's mobile terminal, and is the same as the subscriber information that is transmitted when the terminating MSC 32 requests the ISUP call connection from the IP 50 in the subscriber-based ring-back sound service described with reference to FIGS. 1 to 10. Since the service of this embodiment cannot be provided in the case where the appointed presentee is not a subscriber to the subscriber-base ring-back sound service, a response indicating that the service cannot be provided is transmitted at step S1102.

Thereafter, the ring-back sound presentation server 720 transmits the code information of the ring-back sound and the information of the appointed presentee to the IP server 730 at step S1104, and the IP server 730 stores the received ring-back sound code information in connection with the presentee information in the inactive storage space 731 of the presentee at step S1105. In this case, if the inactive storage space 731 has no available space, the ring-back sound code is stored to be overwritten on the oldest ring-back sound code.

In order to transmit contents indicating who (that is, the presenter) presents which ring-back sound (that is, the appointed ring-back sound) to whom (that is, the presentee) to the presentee in the form of a short message, the ring-back sound presentation server 720 transmits a message requesting the notification of ring-back sound presentation, including call-back information (for example, a call-back umber or call-back URL), the ring-back sound code and the presentee phone number, to the SMS server 740 at step S1106. The SMS server 740 transmits a message notifying the presentee of ring-back sound presentation to the mobile terminal 705 of the presentee in the form of a short message in response to the message requesting the notification of ring-back sound presentation at step S1107.

The presentee perceives the ring-back sound presentation by viewing the contents of the message notifying ring-back sound presentation received through the mobile terminal 705, and the mobile terminal 705 accesses the ring-back presentation server 720 based upon the call-back information at step S1108. Accordingly, the ring-back sound presentation server 720 notifies the presentee of the presented ring-back sound (for example, allows the presentee to listen to the presented ring-back sound), and downloads a condition information list, which is composed according to originators, originator groups, originator ages, originator genders, originator vocations and originating time bands, to the mobile terminal 705 so that the presentee can select one of them at step S1109.

Thereafter, when the presentee selects condition information from the condition information list through the mobile terminal 705 at step S1110, the ring-back sound presentation server 720 perceives the selected condition information and transmits the selected condition information to the IP server 730 together with the presentee information at step S1111.

Finally, the IP server 730 removes and stores the code information of the presented ring-back sound, which has been stored in the inactive storage space 731 at step S1105, to and in the corresponding part of the active storage space 731 in accordance with the received condition information and presentee information so that the ring-back sound of the code is activated to be used in a mobile communications network, instead of the existing ring-back tone at step S1112.

Meanwhile, the presentee (who is a subscriber to the subscriber-based ring-back sound service) stores the code of the ring-back sound presented as described above in the inactive storage space 731 of the IP server 730 (this may be implemented by not selecting the condition information at step S1110, or adding a step of reserving the selection of the condition information to the process) and, thereafter, activates the ring-back sound code in such away as to access the IP server 70 through the Web server 100 constructed on the Internet as described in conjunction with the service changing process of FIG. 8, and remove and store the ring-back sound code stored in the inactive storage space 731 to and in the active storage space 732 of the IP server 730.

[Method of Changing Ring-back Sounds]

A method of changing ring-back sounds in a subscriber-based ring-back sound service in accordance with a preferred embodiment of the present invention is described in detail with reference to the accompanying drawings below.

A description of the ring-back sound changing method partially overlaps the description of the ring-back sound presenting method that was described above as the embodiment of the present invention. Accordingly, overlapped parts are omitted by indicating the parts in brief below.

That is, the description of the construction and operation of FIGS. 7 to 11 is applied to the ring-back sound changing method of this embodiment. Accordingly, in the description of the ring-back sound changing method, the description of the construction and operation of FIGS. 7 to 11 is referred to below.

Figure 15:
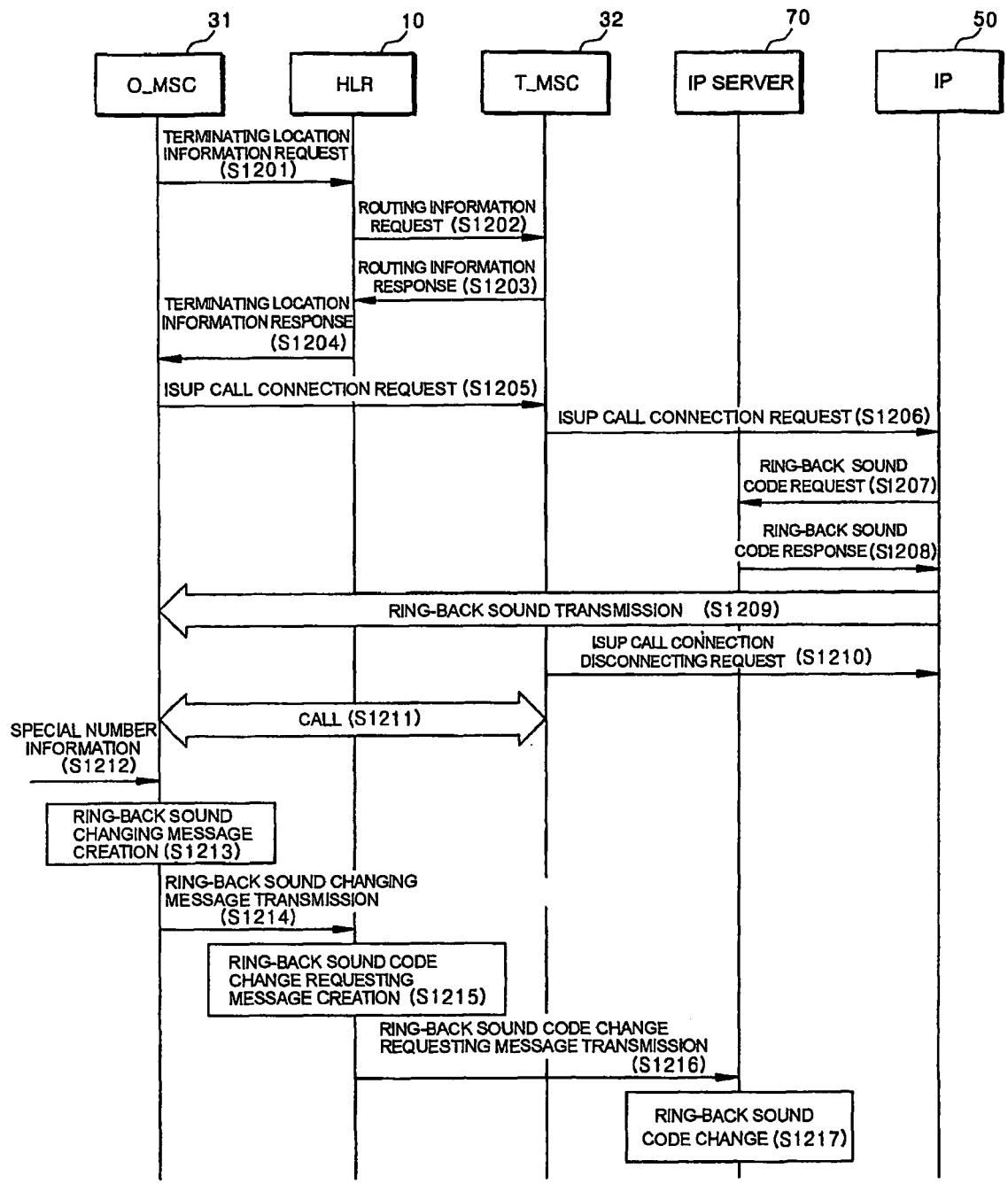
FIG. 15 is a flowchart showing a method of changing ring-back sounds in the subscriber-based ring-back sound service, in which a ring-back sound, to which an originator listens while trying a phone call, is substituted for his/her ring-back sound, in accordance with an embodiment of the present invention.

FIG. 15 is a flowchart showing a method of changing ring-back sounds in the subscriber-based ring-back sound service in accordance with an embodiment of the present invention, which illustrates a process of substituting a ring-back sound, to which an originator listens to while trying a phone call, for his/her ring-back sound.

When an originating subscriber (who is a subscriber to the subscriber-based ring-back sound service of the present invention) calls a terminating subscriber and requests a call connection, a corresponding originating MSC 31 requests terminating location information from the HLR 10 at step S1201.

The HLR 10 requests routing information from the terminating MSC 32 at step S1202, and the terminating MSC 32 responds to the request of step S1202 by providing the routing information (that is, Temporary Local Directory Number (TLDN)) to the HRL 10 at step S1203.

The HRL 10 responds to the request of step S1201 by transmitting the routing information to the originating MSC 31 at step 1204. Thereafter, the originating MSC 31 requests an ISUP call connection from the terminating MSC 32 based upon the routing information to establish a call path at step S1205.

Thereafter, when the terminating MSC 32 refers to the service establishment information (received and stored in the SRBT field of FIG. 11 at step S708-2 of FIG. 7) and '11' is indicated in the SRBT field, the terminating MSC 32 recognizes that a terminator is a subscriber to the service of the present invention and the service is activated, requests an ISUP call connection from the IP 50 based upon the routing information received and stored at step S708-2 of FIG. 7 to establish a trunk call path and, at this time, provides both a terminating phone number and an originating phone number at step S1206. As a result, the call paths are established among the originating MSC 31, the terminating MSC 32 and the IP 50.

The IP 50 inquires a ring-back sound code from the IP server 70 based upon the provided terminating and originating phone numbers at step S1207, and the IP server 70 searches for the ring-back sound code allocated in connection with the provided terminating and originating phone numbers and transmits the searched ring-back sound code to the IP 50 in response to the inquiry of step S1207 at step S1208. The IP 50 transmits a ring-back sound corresponding to the received ring-back sound code, instead of a ring-back tone, to the originator through the established call path. When the terminating subscriber answers the phone while the ring-back sound is being transmitted to the originator, the terminating MSC 32 requests the IP 50 to disconnect the ISUP call connection so that the IP 50 can disconnect the ISUP call connection at step S1210, and, at the same time, allows the originator and the terminating subscriber to make a call through the call path established between the originating MSC 31 and the terminating MSC 32 at step S1211.

When an originating subscriber selects and pushes a certain number (for example, *99) preset for the ring-back sound changing service through his/her mobile terminal while performing a phone call with a terminating subscriber, the information of the selected certain number is recognized by the originating MSC 31 at step S1212, and the originating MSC 31 creates a ring-back sound changing message based upon the information of the certain number at step S1213. The ring-back sound changing message includes the information of the certain number and originating and terminating phone numbers, and can be constructed, for example, in the form of a feature request Mobile Application Protocol (Feature Request MAP).

The originating MSC 31 transmits the created ring-back sound changing message to the HLR 10, and the HLR 10 is aware that a message indicates the change of a ring-back sound by recognizing that the certain number information is included in the created ring-back sound changing message, creates a message requesting the change of a ring-back sound code, including the information of the originating and terminating phone numbers, and transits the message requesting the change of the ring-back sound code to the IP server 70 corresponding to the originating phone number according to Internet Protocol at step S1216.

Finally, the IP server 70 substitutes the ling-back sound code preset in connection with the terminating number for the ring-back sound code for the ring-back sound code preset in connection with the originating number at step S1217.

Figure 16:
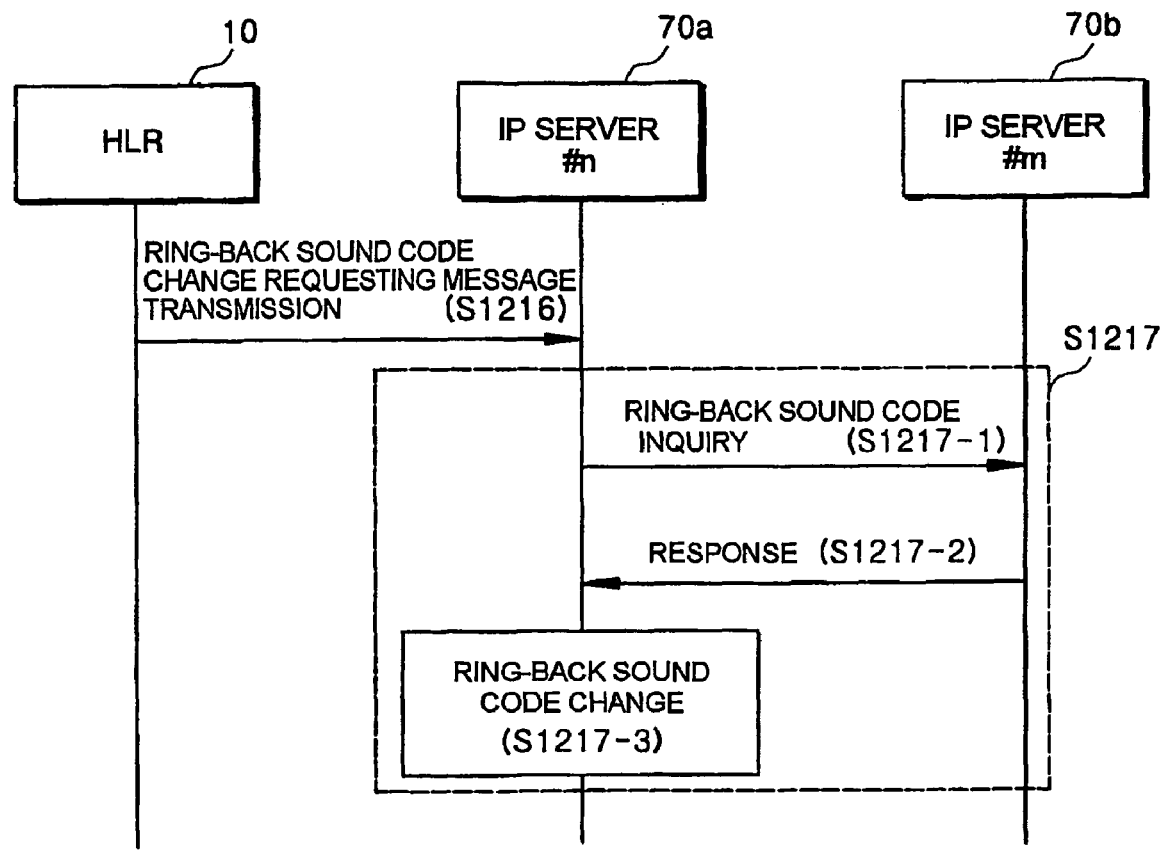
FIG. 16 is a flowchart showing the detailed process of step S1217 of FIG. 15.

FIG. 16 is a flowchart showing the detailed process of step S1217 of FIG. 15, which illustrates an example of the detailed process of step S1217 in the case where a plurality of IP servers 70 are constructed in connection with the phone numbers of subscribers on the Internet.

When the HLR 10 transmits the created message requesting the change of the ring-back sound to an IP server #n 70a corresponding to the originating phone number (that is, the phone number of the originating subscriber) at step S1216 of FIG. 16, the IP server #n 70a inquires a ring-back sound code corresponding to the terminating phone number (that is, the phone number of the terminating subscriber) from an IP server #m 70b corresponding to the terminating phone number at step S1217-1, the IP server #m 70b transmits the information of the ring-back sound code corresponding to the terminating phone number to the IP server #n 70a in response to the inquiry of step S1217-1 at step S1217-2, and the IP server #n 70a substitutes the ring-back sound code preset in connection with the terminating phone number for the ring-back sound code present in connection with the originating phone number at step S1217-3. In the above-described process, communication between the IP server #n 70a and the IP server #m 70b is performed based upon Internet Protocol.

Figure 17:
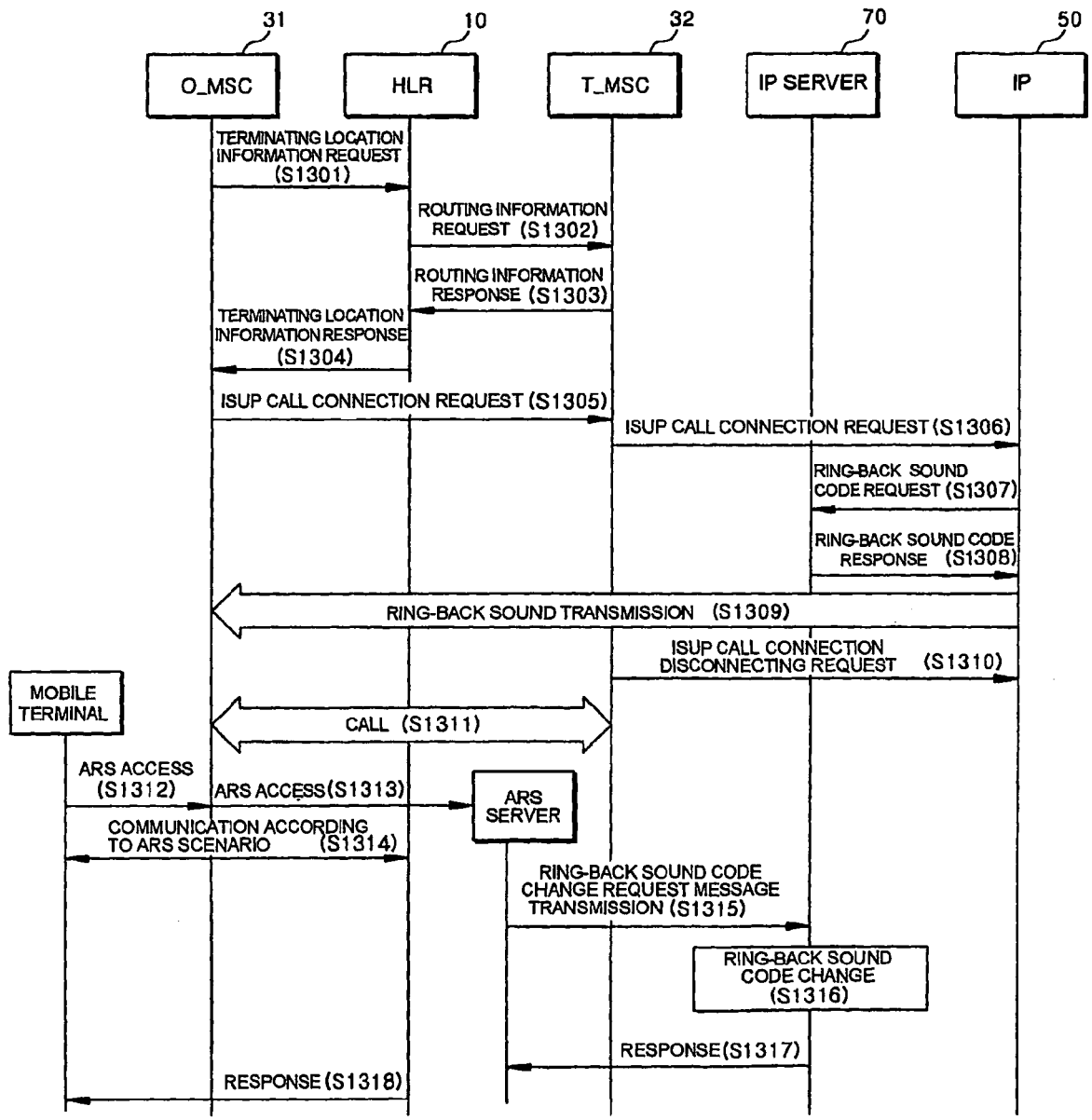
FIG. 17 is a flowchart showing a method of changing ring-back sounds in the subscriber-based ring-back sound service, in which a ring-back sound, to which an originator listens while trying a phone call, is substituted for his/her ring-back sound, in accordance with another embodiment of the present invention.

FIG. 17 is a diagram showing a method of changing the ring-back sound the subscriber-based ring-back sound service in accordance with another embodiment of the present invention, which illustrates the process of substituting a ring-back sound, to which an originating subscriber listens, for his/her existing ring-back sound.

When an originating subscriber (who is a subscriber to the subscriber-based ring-back sound service of the present invention) calls a terminating subscriber and requests a call connection, a corresponding originating MSC 31 requests terminating location information from the HLR 10 at step S1301.

The HLR 10 requests routing information from the terminating MSC 32 at step S1302, and the terminating MSC 32 responds to the request of step S1202 by providing the routing information (that is, Temporary Local Directory Number (TLDN)) to the HRL 10 at step S1303.

The HRL 10 responds to the request of step S1301 by transmitting the routing information to the originating MSC 31 at step 1304. Thereafter, the originating MSC 31 requests an ISUP call connection from the terminating MSC 32 based upon the routing information to establish a call path at step S1305.

Thereafter, when the terminating MSC 32 refers to the service establishment information (received and stored in the SRBT field of FIG. 11 at step S708-2 of FIG. 7) and '11' is indicated in the SRBT field, the terminating MSC 32 recognizes that a terminator is a subscriber to the service of the present invention and the service is activated, requests an ISUP call connection from the IP 50 based upon the routing information received and stored at step S708-2 of FIG. 7 to establish a trunk call path and, at this time, provides both a terminating phone number and an originating phone number at step S1306. As a result, the call paths are established among the originating MSC 31, the terminating MSC 32 and the IP 50.

The IP 50 inquires a ring-back sound code from the IP server 70 based upon the provided terminating and originating phone numbers at step S1307, and the IP server 70 searches for the ring-back sound code allocated in connection with the provided terminating and originating phone numbers and transmits the searched ring-back sound code to the IP 50 in response to the inquiry of step S1307 at step S1308. The IP 50 transmits a ring-back sound corresponding to the received ring-back sound code, instead of a ring-back tone, to the originator through the established call path at step S1309.

When the terminating subscriber answers the phone while the ring-back sound is being transmitted to the originator, the terminating MSC 32 requests the IP 50 to disconnect the ISUP call connection so that the IP 50 can disconnect the ISUP call connection at step S1310. At the same time, the terminating MSC 32 allows the originator and the terminating subscriber to make a call through the call path established between the originating MSC 31 and the terminal MSC 32 and, thereafter, disconnects the call path between the originating MSC 31 and the terminating MSC 32 after the completion of the phone call at step S1311.

When the originating mobile terminal of the originating subscriber accesses a certain ARS server after the phone call between the originating subscriber and the terminating subscriber is completed at steps S1312 and S1313, the ARS server communicates with the originating mobile terminal according to an appointed ARS communications scenario, and receives a first subscriber phone number, which is the phone number of the originating subscriber, and a second subscriber phone number, which is the phone number of the terminating subscriber that the originating subscriber has called, selected and input by the originating subscriber through the originating mobile terminal at step S1314.

Thereafter, the ARS server creates a message requesting the change of a ring-back sound code, including the information of the first and second subscriber phone numbers, and transmits the message requesting the change of the ring-back sound code to an IP server 70 corresponding to the first subscriber phone number according to Internet Protocol at step S1315. In this case, it is set forth beforehand that the ARS server has stored information for performing routing to the IP server 70.

Finally, when the IP server 70 substitutes a ring-back sound code preset in connection with the second subscriber phone number for a ring-back sound code preset in connection with the first subscriber phone number based upon the received message requesting the change of the ring-back sound code at step S1316 and notifies the ARS server of the change of the ring-back sound at step S1317, the ARS server transmits a voice message notifying the originating mobile terminal of the change of the ring-back sound at step S1318.

Figure 18:
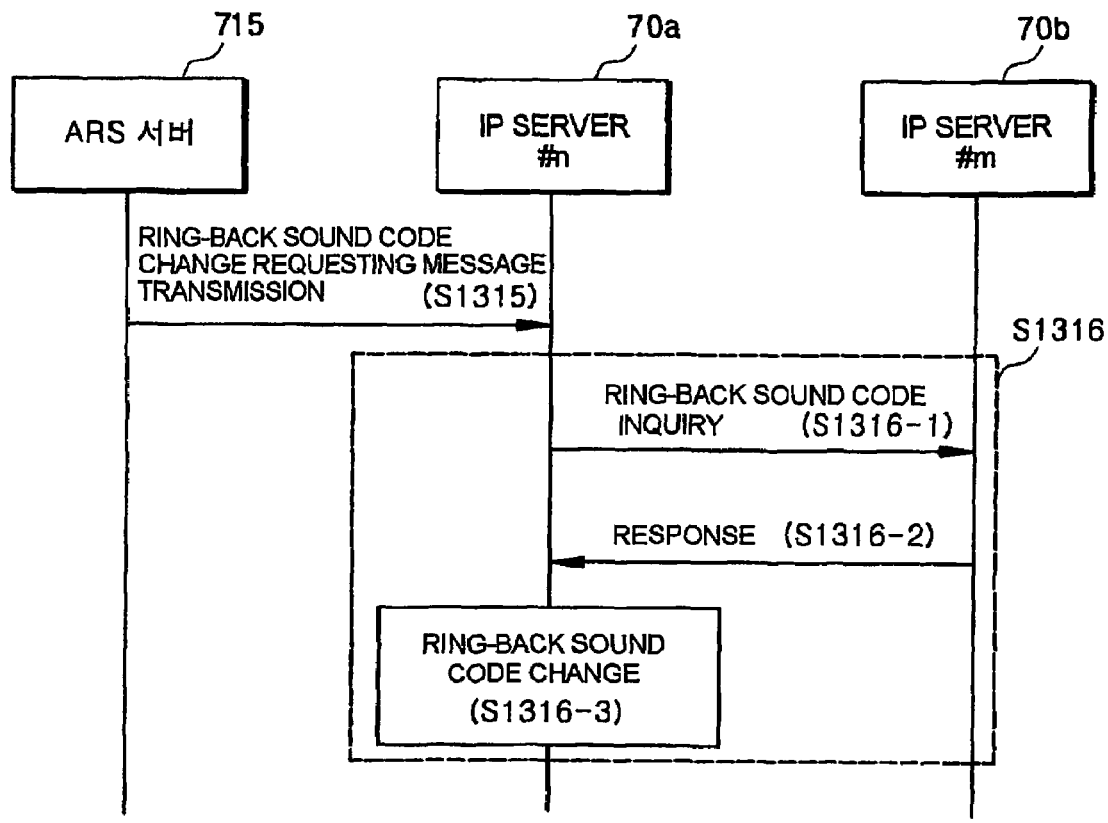
FIG. 18 is a flowchart showing a detailed process of step S1316 of FIG. 17.

FIG. 18 is a flowchart showing a detailed process of step S1316 of FIG. 17 in the case where a plurality of IP servers 70 are constructed in connection with the phone numbers of subscribers on the Internet.

When the ARS server transmits the created message requesting the change of the ring-back sound to an IP server #n 70a corresponding to the first subscriber phone number (that is, the phone number of the originating subscriber) at step S1315 of FIG. 17, the IP server #n 70a inquires a ring-back sound code corresponding to the second subscriber phone number (that is, the phone number of the terminating subscriber) from an IP server #n 70b corresponding to the second subscriber phone number at step S1316-1, the IP server #m 70b transmits the information of the ring-back sound code corresponding to the second subscriber phone number to the IP server #n 70a in response to the inquiry of step S1316-1 at step S1316-2, and the IP server #n 70a substitutes the ring-back sound code preset in connection with the second subscriber phone number for the ring-back sound code present in connection with the first subscriber phone number at step S1316-3. In the above-described process, communication between the IP server #n 70a and the IP server #m 70b is performed based upon Internet Protocol. It is set forth beforehand that the ARS server information for performing routing to the plurality of IP servers 70a and 70b with respect to each of subscriber phone numbers.

Meanwhile, for the modified embodiment of FIG. 17, there may be employed a method in which, in the case where the originating mobile terminal accesses the ARS server through steps S1312 and 1313, step S1314 is excluded from this embodiment, the first subscriber phone number is set to the subscriber phone number according to recent call information stored in the originating mobile terminal and the second subscriber is set to the second subscriber phone number, and the set first and second phone numbers are automatically uploaded to the connected ARS server.

INDUSTRIAL APPLICABILITY

As described above, the present invention provides a method and apparatus for managing ring-back sounds, which are capable of maintaining capacity with respect to each of IPs and providing both a common ring-back sound service and an individual ring-back sound service without hindrance even if the number of subscribers is increased.

Further, in accordance with the method of changing ring-back sounds in the subscriber-based ring-back sound service, which allows the subscriber to present the ring-back sound to another subscriber and the presentee subscriber selectively activates the presented ring-back sound in the subscriber-based ring-back sound service, which provides a personal public relations means for advertising himself/herself by allowing the terminating subscriber to register and select a ring-back sound that the terminating subscriber wants, which allows the terminating subscriber to notify the originator of his/her identity by allowing the terminating subscriber to store and transmit the ring-back sound, such as voice, and which provides an effective advertising means by providing the terminating subscriber with an opportunity to advertise his/her company or organization, thus increasing profits due to the creation of an added service and improving the quality of service.

Further, in accordance with the method of changing ring-back sounds in the subscriber-based ring-back sound service, which allows the originating subscriber to take the ring-back sound of the terminating subscriber and set the ring-back sound of the terminating subscriber for a substitute ring-back sound in the subscriber-based ring-back sound service, which provides a personal public relations means for advertising himself/herself by allowing the terminating subscriber to register and select a ling-back sound that the terminating subscriber wants, which allows the terminating subscriber to notify the originator of his/her identity by allowing the terminating subscriber to store and transmit the ring-back sound, such as voice, and which provides an effective advertising means by providing the terminating subscriber with an opportunity to advertise his/her company or organization.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of managing ring-back sounds in a subscriber-based rung-back sound service, comprising:
the first step of storing common ring-back sounds and reporting details of use of the common ring-back sounds to a ring-back sound management server, in each of Intellectual Peripherals (IPS);
the second step of storing individual ring-back sounds and reporting details of use of the individual ring-back sounds to the ring-back sound management server, in each of large capacity storage devices connecting and interworking with one or more IPs; and
the third step of statistically compiling the reported details of use of the common and individual ring-back sounds and determining whether to maintain storage of the common and individual ring-back sounds based up the statistically complied details, in the ring-back sound management server.

2. The method as set forth in claim 1, further comprising the step of requesting the IP or large capacity storage device to delete a ring-back sound determined at the third step so that the ring-back sound is deleted, after the third step.

3. The method as set forth in claim 1, further comprising the step of requesting the IP to remove a ring-back sound determined at the third step so that the ring-back sound is removed from the IP to the large capacity storage device, after the third step.

4. The method as set forth in claim 1, wherein the IPs each search for a corresponding ring-back sound in the large capacity storage devices and transmit the searched corresponding ring-back sound if there is no corresponding ring-back sound to be provided to an originator during call establishment between the originator and a terminator.

5. An apparatus for managing ring-back sounds in a subscriber-based ring-back sound service system, the subscriber-based ring-back sound service system having ring-back sound provision means for storing a variety of ring-back sounds, connecting with Mobile Switching Centers (MSCs) of a mobile communications network via a gateway and providing the stored ring-back sounds to the MSCs; ring-back sound provision control means for communicating with an Intellectual Peripheral (IP) via an Internet connection and specifying a kind of a ring-back sound to be provided to the MSCs based upon a combination of identification of a terminating subscriber that a call connection is requested to reach, identification of an originator corresponding to the identification of the terminating subscriber, and information on a time band in which the request of the call connection is made: a Web server for connecting with the ring-back sound provision means or ring-back sound provision control means via the Internet connection, and adding ring-back sounds to the ring-back sounds stored in the ring-back sound provision means or changing ring-back sound specifying information of the ring-back sound provision control means; a Home Location Register (HLR) for storing first information about whether to substitute for an existing ring-back tone and second information for performing routing to the ring-back sound provision means as profile information of a terminating subscriber: the MSCs for receiving and storing the established first and second information while communicating with the HLR at a time of registering a location of the terminating subscriber, receiving a ring-back sound while communicating with the ring-back sound provision means based upon the first and second information, and providing the received ring-back sound to the corresponding originator, instead of the existing ring-back sound, the apparatus comprising:
ring-back sound provision means for storing common ring-back sounds;
large capacity storage devices each interworking with the ring-back sound provision means; and
a ring-back sound management server for statistically compiling the reported details of use of the common and individual ring-back sounds, determining whether to maintain storage of the common and individual ring-back sounds based on the statistically complied details, requesting the ring-back sound provision means or the large capacity storage devices to delete a determined ring-back sound so that the ring-back sound is deleted therefrom, and requesting the IP to remove the determined ring back sound so that the ring-back sound is removed from the IP to the large capacity storage devices.

6. The apparatus as set forth in claim 5, wherein the IP, the large capacity storage devices and an IP server communicate with each other based upon Transmission Control Protocol/Internet Protocol (TCP/IP).

7. The apparatus as set forth in claim 5, wherein the IP, the large capacity storage devices and an IP server communicate with each other based upon a Local Area Network (LAN).

8. A method of presenting ring-back sounds in a subscriber-based ring-back sound service, the subscriber-based ring-back sound service being performed in such a way as to store a plurality of ring-back sounds corresponding to ring-back sound codes in ring-back sound provision means constructed to be linked to a mobile communications network, and provide originators with a ring-back sound corresponding to a ring-back sound code selected by a terminating subscriber with respect to each of originators, originator groups, originating time bands and default, comprising:

the first step of selecting a ring-back sound while communicating with a ring-back sound presentation server through one of Web data communication and WAP communication server by a presenter and providing ring-back sound code information of the selected ring-back sound and subscriber information of a presentee to the ring-back sound provision means;

the second step of transmitting a message notifying ring-back sound presentation, including call-back information, to a mobile terminal of the presentee in a short message form via a Short Message Service (SMS) server of the mobile communications network based upon the subscriber information of the presentee; and the third step of selecting the condition information while communicating with the ring-back sound presentation server according to the call-back information, and providing the selected condition information from the ring-back sound presentation server to the ring-back sound provision means.

9. The method as set forth in claim 8, wherein the ring-back sound provision means stores the provided ring-back sound information in an inactive storage space of a corresponding subscriber, activates the provided ring-back sound information according to the provided condition information, and uses the activated ring-back sound information as a substitute ring-back sound.

10. The method as set forth in claim 9, wherein the inactive storage space stores one or more ring-back sound codes, and causes a new ring-back sound to be overwritten on an oldest ring-back sound when having no available space.

11. The method as set forth in claim 9, wherein the inactivated ring-back sound codes stored in the inactive storage space are accessed and selectively activated through a wired or wireless Internet.

12. An apparatus for presenting ring-back sounds in a subscriber-based ring-back sound service, the subscriber-based ring-back sound service providing a ring-back sound selected by a terminating subscriber to originators, comprising:

a ring-back sound provision means constructed in conjunction with a mobile communications network to store a plurality of ring-back sounds corresponding to ring-back sound codes, and provide a ring-back sound corresponding to a ring-back sound code selected by a presenter according to condition information regarding originators, originator groups, originating time bands and default, instead of an existing ring-back tone;

a ring-back sound presentation means interworking with the ring-back sound provision means via an Internet connection to provide ring-back sound code information of the ring-back sound selected by the presenter and subscriber information of the presentee, transmit a message notifying ring-back sound presentation, including call-back information, to a mobile terminal of the presentee in a short message form via a SMS server based upon the subscriber information of the presentee, cause condition information to be selected through the mobile terminal of the presentee based upon the call-back information, and provide the selected condition information to the ring-back sound provision means; and a communication intermediation means provided with an Automatic Response Service (ARS) server for intermediating voice communication between the ring-back sound provision means and a terminal of the presenter and a Web server and WAP server for intermediating data communication between the ring-back sound provision means and the terminal of the presenter.

13. The apparatus as set forth in claim 12, wherein the ring-back sound provision means is provided with an inactive storage space and an active storage space stores the provided ring-back sound code information in the inactive storage space of the presentee remove and store the provided ring-back sound code information to and in the active storage space to be activated, and provide a ring-back tone corresponding to the ring-back sound code information stored in the active storage space.

14. The apparatus as set forth in claim 13, wherein the ring-back sound provision means is provided with the inactive storage space constructed to store plural pieces of ring-back sound information, and overwrites new ring-back sound information on oldest ring-back sound information when the inactive storage space has no available space.

15. A method of changing ring-back sounds in a subscriber-based ring-back sound service, comprising:

the first step of providing first information about whether to substitute for an existing ring-back tone and second information for performing routing to an ring-back sound provision means, preset in a Home Location Register (HLR) at a time of registering a location of a terminating subscriber, from the HLR to a corresponding terminating MSC;

the second step of providing a ring-back sound to a corresponding originator or requesting a trunk call connection from the ring-back sound provision means in response to the provided first and second information when perceiving that an originating MSC requests a call connection to the terminating subscriber, in the terminating MSC;

the third step of search for a ring-back sound code preset in connection with a phone number of the terminating subscriber after performing the trunk call connection in response to the request of the trunk call connection, and providing a ring-back sound corresponding to the searched ring-back sound code to the originator via the connected terminating MSC, instead of the ring-back tone, in a ring-back sound provision control means;

the fourth step of requesting disconnection of the trunk call connection from the ring-back sound provision means when perceiving that the terminating subscriber answers the call in the terminating MSC, and disconnecting the trunk call connection in response to the request of the trunk call disconnection by the ring-back sound provision means;

the fifth step of creating a message, including a special number, a terminating phone number and an originating phone number, based upon information of the special number selected by the originator while trying a phone call and transmitting this message to the HLR, in the originating MSC;

the sixth step of transmitting a message requesting change of a ring-back sound code to the ringback sound provision control means in response to the received message in the HLR; and the seventh step of substituting the ring-back sound code preset in connection with the terminating phone number for a ring-back sound code preset in connection with the originating phone number in response to the message requesting change of a ring-back sound code, in the ring-back sound provision control server.

16. The method as set forth in claim 15, wherein communication between the HLR and the ring-back sound provision control means is performed based upon Internet Protocol.

17. The method as set forth in claim 15, wherein the message created in the originating MSC and transmitted to the HLR at the fifth step is formed of a feature request Mobile Application Protocol (Feature Request MAP).

18. The method as set forth in claim 15, wherein, if the ring-back sound provision control means comprises a plurality of ring-back sound provision control means; the HLR transmits the message requesting the change of the ring-back sound code to a first ring-back sound provision control means corresponding to the originating phone number at the sixth step, and the first ring-back sound provision control means inquires a ring-back sound code corresponding to the terminating phone number from a second ring-back sound provision control means corresponding to the terminating phone number and substitutes the ring-back sound code corresponding to the terminating phone number included in a response to the request for a ring-back sound code corresponding to the originating phone number.

19. The method as set forth in claim 15 or 18, wherein communication between the ringback sound provision means and the ring-back sound provision control means is performed based upon Internet Protocol.

20. A method of changing ring-back sounds in a subscriber-based rung-back sound service, the subscriber-based ring-back sound service being performed by the step of providing first information about whether to substitute for an existing ring-back tone and second information for performing routing to an ring-back sound provision means preset in a Home Location Register (HLR) at a time of registering a location of a terminating subscriber, from the HLR to a corresponding terminating MSC; the step of providing a ring-back sound to a corresponding originator or requesting a trunk call connection from the ring-back sound provision means in response to the provided first and second information when perceiving that an originating MSC requests a call connection to the terminating subscriber, in the terminating MSC; the step of search for a ring-back sound code preset in connection with a phone number of the terminating subscriber after performing the trunk call connection in response to the request of the trunk call connection, and providing a ring-back sound corresponding to the searched ring-back sound code to the originator via the connected terminating MSC, instead of the rung-back tone, in a ring-back sound provision control means; and the step of requesting disconnection of the trunk call connection from the ring-back sound provision means when perceiving that the terminating subscriber answers the call in the terminating MSC, and disconnecting the trunk call connection in response to the request of the trunk call disconnection by the ring-back sound provision means comprising:

the first step of storing information for performing routing to the ring-back sound provision control means in connection with a phone number of the subscriber, receiving phone number information of a first subscriber and phone number information of a second subscriber through ARS communication with the first subscriber, and transmitting a message requesting change of a ring-back sound code to a first ring-back sound provision control means corresponding to a phone number of the first subscriber, in an ARS server, and the second step of inquiring a ring-back sound code corresponding to the phone number of the second subscriber from a second ring-back sound provision control means corresponding to the phone number of the second subscriber according to information for performing routing to the second ring-back sound provision control means, and substituting the ring-back sound code corresponding to the phone number of the second subscriber for a ring-back sound code corresponding to the phone number of the first subscriber.

21. The method as set forth in claim 20, wherein a mobile terminal of the first subscriber provides a phone number thereof and a phone number with which the mobile terminal recently made a call, to the connected ARS server as the phone number information of the first subscriber and the phone number information of the second subscriber, respectively.

22. The method as set forth in claim 20, wherein the phone number information of the first subscriber and the phone number information of the second subscriber are input through a mobile terminal of the first subscriber during the ARS communication.

* * * * *